US007420589B2

(12) United States Patent
Kamijo et al.

(10) Patent No.: US 7,420,589 B2
(45) Date of Patent: Sep. 2, 2008

(54) METHOD AND APPARATUS FOR PROCESSING PICTURES OF MOBILE OBJECT

(75) Inventors: Shunsuke Kamijo, Kawasaki (JP);
Masao Sakauchi, Yokohama (JP);
Katsushi Ikeuchi, Yokohama (JP)

(73) Assignees: Fujitsu Limited, Kawasaki (JP); The Foundation for the Promotion of Industrial Science, Tokyo (JP)

( * ) Notice: Subject to any disclaimer, the term of this patent is extended or adjusted under 35 U.S.C. 154(b) by 524 days.

(21) Appl. No.: 11/199,282

(22) Filed: Aug. 9, 2005

(65) Prior Publication Data
US 2005/0285940 A1 Dec. 29, 2005

Related U.S. Application Data

(62) Division of application No. 10/120,374, filed on Apr. 12, 2002, now Pat. No. 7,298,394.

(30) Foreign Application Priority Data
Jun. 21, 2001 (JP) ............................. 2001-187502

(51) Int. Cl.
*H04N 7/18* (2006.01)
(52) U.S. Cl. ........................................ 348/149; 701/301
(58) Field of Classification Search ................. 348/148, 348/149, 135, 118, 113, 119, 699, 143; 382/209, 382/30, 31, 32, 104, 106, 372, 162, 163, 382/164, 168, 171, 172, 276, 282, 107; 701/117, 701/301, 300, 118, 119, 120, 121, 122, 302
See application file for complete search history.

(56) References Cited

U.S. PATENT DOCUMENTS
6,188,778 B1 2/2001 Higashikubo et al.

FOREIGN PATENT DOCUMENTS
| EP | 0 505 858 A1 | 9/1992 |
| EP | 0 807 914 A1 | 11/1997 |
| JP | 2001-148019 | 5/2001 |
| WO | WO 00/31706 | 6/2000 |

OTHER PUBLICATIONS
U.S. Appl. No. 11/199,206, filed Aug. 9, 2005, Shunsuke Kamijo et al.

(Continued)

*Primary Examiner*—Tung Vo
*Assistant Examiner*—Behrooz Senfi
(74) *Attorney, Agent, or Firm*—Staas & Halsey LLP

(57) ABSTRACT

A feature amount of an inter-mobile unit relative movement are detected as an observation amount by an observation amount detecting section 26, time series of the observation amounts are stored as an observation series into a storage section 27 to calculate a similarity of the observation series to a predetermined collision observation series by a classification section 28. A determination section 29 determines to be a collision accident if, in a case where the similarity is larger than a predetermined value, a mobile unit associated with the similarity is at rest in a stoppage prohibition area set in a storage section 30 and another mobile unit is moving, and to be a mobile unit failure if collision determination conditions except for the similarity are met. By consisting of not only a first scalar obtained by quantizing a relative velocity vector between mobile units but also a second scalar obtained by quantizing a relative position vector between mobile units as the observation amount, a relative movement between mobile units is classified in more detail. A mobile unit is tracked in units of block by a mobile unit tracking section 25 to discriminate overlapped mobile units in pictures.

5 Claims, 19 Drawing Sheets

OTHER PUBLICATIONS

European Search Report, dated Apr. 28, 2006.

Tieniu Tan, "Locating and Recognizing Road Vehicles", Optical Engineering, Society of Photo-optical Instrumentation Engineers, Bellingham, vol. 37, No. 1, 1998, XP000736284, pp. 202-207.

Shunsuke Kamijo, et al. "Traffic Monitoring and Accident Detection at Intersections." IEEE Transactions on Intelligent Transportation Systems, vol. 1, No. 2, Jun. 2000 (pp. 108-118).

Shunsuke Kamijo, et al. "Incident Detection at Intersections Utilizing Hidden Markov Model." 6th World Congress on Intelligent Transport Systems, Nov. 8-12, 1999, Toronto, Canada (pp. 1-10).

Shunsuke Kamijo, et al. "Occlusion Robust Vehicle Tracking Utilizing Spatio—Temporal Markov Random Field Model." 7th World Congress on Intelligent Transport Systems, Nov. 6-9, 2000, Turin, Italy (5pp).

Tieniu Tan, "Locating and recognizing road vehicles", Optical Engineering, vol. 37, No. 1, (Jan. 1998), XP000736284, pp. 202-207.

Sylvia Gil et al., "Feature Selection for object tracking in traffic scenes", SPIE vol. 2344 Intelligent Vehicle Highway Systems (1994), XP000689133, pp. 253-266.

U.S. Appl. No. 10/120,374, filed Apr. 12, 2002, Shunsuke Kamijo et al.

FIG.8(A)  PAS00
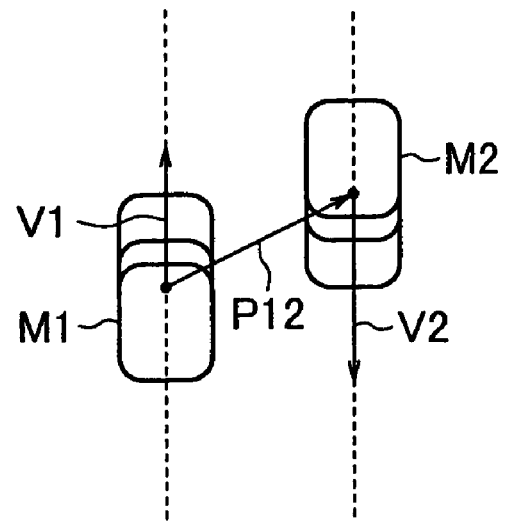
FIG.8(B)  PAS11
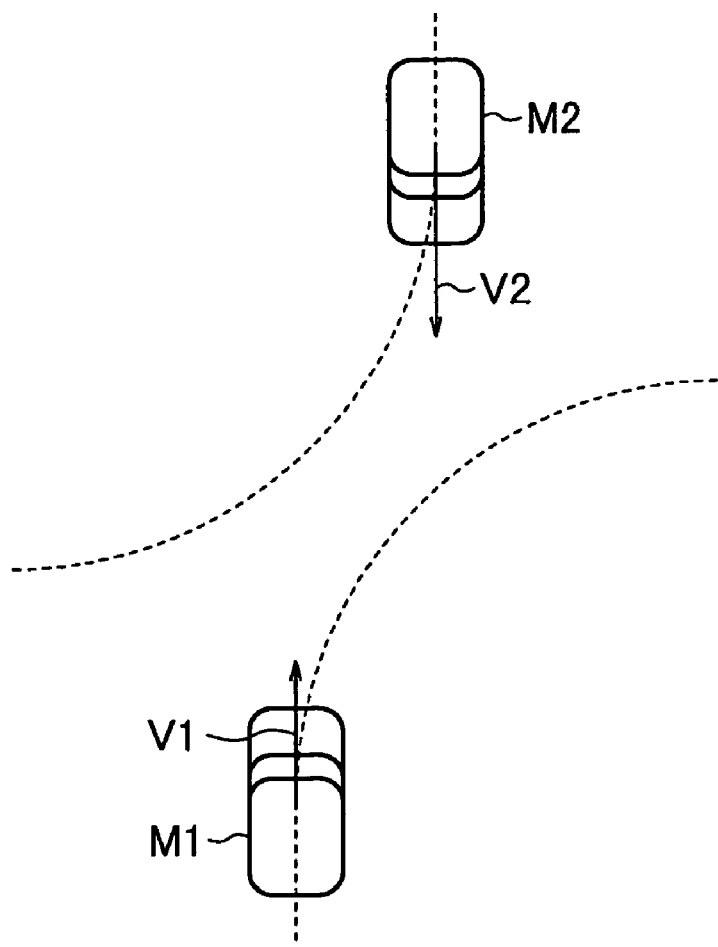

FIG.9(A) PAS20
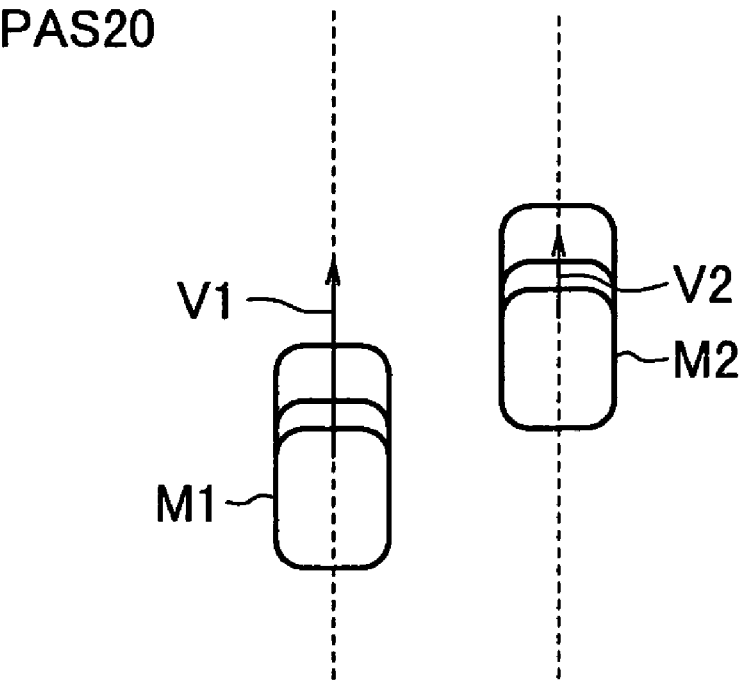
FIG.9(B) PAS13
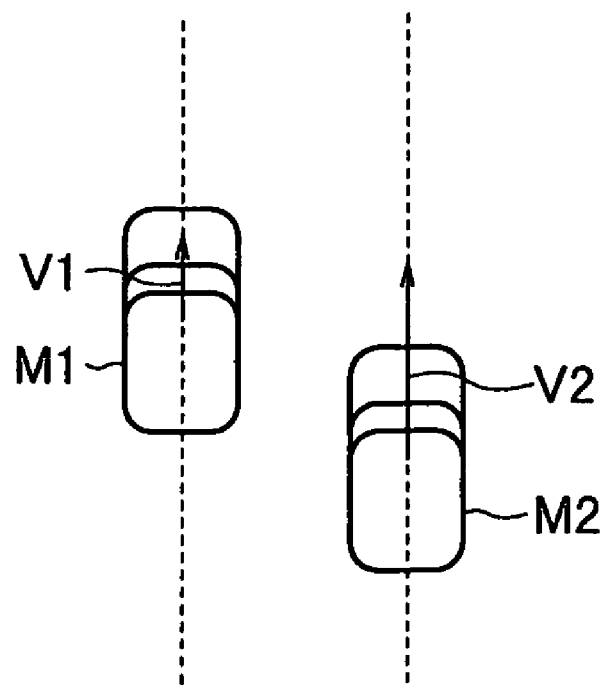

TIME (t + 1)

METHOD AND APPARATUS FOR PROCESSING PICTURES OF MOBILE OBJECT

CROSS-REFERENCE TO RELATED APPLICATIONS

This application is a divisional of application Ser. No. 10/120,374, filed Apr. 12, 2002 now U.S. Pat. No. 7,298,394, now pending.

This application is based upon and claims the priority of Japanese application no. 2001-187502, filed Jun. 21, 2001, and U.S. patent application Ser. No. 10/120,374, filed Apr. 12, 2002, the contents being incorporated herein by reference.

BACKGROUND OF THE INVENTION

1. Field of the Invention

The present invention relates to a method and an apparatus for processing pictures of mobile unit, more particularly, to a method and an apparatus for processing time-series pictures to detect an anomaly such as collision or failure of mobile unit in the pictures.

2. Description of the Related Art

Early detection of a traffic accident can not only enhance a success rate in life saving by speedy rescue operation, but also alleviate accident-related traffic congestion by speedup of the police inspection at the site. Therefore, various kinds of automation in recognition of traffic accident are expected.

In the publication of JP 2001-148019-A whose inventors are the same as those of the present application, there is disclosed a mobile unit anomaly detection method processing time-series pictures to detect an anomaly of mobile unit in pictures, comprising the steps of:

Recently, a disc loading apparatus without a tray is widely used to reduce a size thereof and save a space. Additionally, a loading apparatus has been disclosed in Korean Patent No. 10-0433415 filed by the present applicant, which is able to selectively load discs in different sizes, for example, 80 mm and 120 mm.

(a) identifying mobile units in a frame picture at a time t on the basis of a correlation between frame pictures at times (t−1) and t;

(b) detecting a feature amount of a relative movement of a second mobile unit relative to a first mobile unit as an observation amount to store observation amounts in time-series as an observation series;

(c) calculating a similarity of the observation series to each reference series to classify a movement between mobile units; and (d) determining that a collision accident has occurred when the similarity of the observation series to a collision reference series is larger than a predetermined value.

According to this method, it is possible to automatically detect an anomaly such as a collision accident.

However, in a case where a camera angle is low with respect to a road surface, for example, if the second mobile unit approaches the first mobile unit at rest and thereafter, the first mobile unit starts and stops, the second mobile unit overlaps the first mobile unit on pictures at times of the approach and a distance therebetween becomes zero, which is sometimes wrongly determined as a time series pattern of a collision accident Further, in the above publication, a scalar obtained by quantizing $V/(d+\epsilon)$ is used as an observation amount in the step (b), where V denotes a relative motion vector of the second mobile unit with respect to the first mobile unit and $\epsilon$ denotes a constant to avoid the denominator to be zero.

By using this observation amount, various kinds of movements between mobile units can be classified with a small number of reference series because of the quantization.

However, there has been a problem of impossibility of more detailed classification of movements between mobile units.

In the above publication, in the step (a), by using the identification result of a mobile unit in a frame picture at the time (t−1), the mobile unit in a frame picture at the time t can be identified with ease from the correlation.

However, in a case where mobile units are shot from the front thereof at a low camera angle with respect to a road surface in order to shoot a wide area with one camera to track the mobile units, overlap between mobile units on a picture frequently occurs as shown in FIG. 13. At the time (t−1), mobile units M1 and M2 are identified as one cluster without discriminating the mobile units M1 and M2 from each other. Although a representative motion vector of this cluster is used to identify the cluster including the mobile units M1 and M2 at the time t on the basis of the above-described correlation, accurate identification is disabled since there is a difference in speed between the mobile units M1 and M2. At the next time (t+1), although the mobile unit M2 has been separated from the mobile unit M1, the mobile units M2 and M3 are identified as one cluster since they overlap each other, disabling discrimination of the mobile units M2 and M3 from each other.

SUMMARY OF THE INVENTION

Accordingly, it is an object of the present invention to provide a method and an apparatus for processing pictures of mobile unit, capable of automatically detecting anomaly such as a collision accident more accurately.

It is another object of the present invention to provide a method and an apparatus for processing pictures of mobile units, capable of performing more detailed classification of various kinds of movements between mobile units with a small number of reference series.

It is still another object of the present invention to provide a method and an apparatus for processing pictures of mobile units, capable of identifying different mobile units even if overlapping between the mobile units frequently occurs.

In one aspect of the present invention, there is provided a mobile unit anomaly detection method of processing time series pictures to detect an anomaly of a mobile unit in a picture, comprising the steps of:

(a) detecting a feature amount of a relative movement of a second mobile unit with respect to a first mobile unit as an observation amount to store a time series of the observation amounts as an observation series;

(b) calculating a similarity of the observation series to a predetermined collision observation series; and (c) when the similarity is larger than a predetermined value, determining whether or not a collision accident has happened on the basis of whether or not the first or second mobile unit is at rest in a predetermined stoppage prohibition area.

In a case where mobile units approaching each other overlap in a picture even if the mobile units have not collided against each other because of a low camera angle with respect to a road surface, collision accidents are excessively detected when a collision accident is determined only with a similarity between an observation series and a reference series. However, according to this configuration, the collision accident between mobile units is determined more accurately, enabling reduction in excessive detection of the collision accident.

In the above step (c), by considering whether or not another mobile unit is moving, chances of excessive detection of the collision accident can be further reduced. When the similarity is smaller than the predetermined value, determining whether or not the first or second mobile unit at rest is in failure on the basis of whether the first or second mobile unit is at rest in the predetermined stoppage prohibition area.

Further, in a case where the same conditions for collision determination are met except that the similarity obtained in the above step (b) is smaller than the predetermined value, it can be determined at a higher probability that a mobile unit at rest is in failure. In this case as well, by considering whether or not another mobile unit is moving, it can be determined at a higher probability that a mobile unit at rest is in failure. In another aspect of the present invention, there is provided an inter-mobile unit movement classification method of processing time series pictures to classify a movement between mobile units in at least one of the pictures, comprising the steps of:

(a) detecting a feature amount of a relative movement of a second mobile unit with respect to a first mobile unit as an observation amount to store a time series of the observation amounts as an observation series;

(b) calculating a similarity of the observation series to a reference series; and (c) classifying a movement of the second object with respect to the first mobile unit according to a value of the similarity; wherein the observation amounts each include: a first scalar obtained by quantizing an amount associated with both a relative velocity V of the second mobile unit with respect to the first mobile unit and a distance d between the first and second mobile units; and a second scalar obtained by quantizing a relative position vector of the second mobile unit with respect to the first mobile unit.

With this configuration, since the second scalar obtained by quantizing the relative position vector V is used, relative movements between mobile units can be classified that have been unable to be discriminated from each other only with the first scalar associated with the relative velocity vector, which enables grasping a situation more accurately, leading to a contribution to more accurate detection of a traffic accident.

In still another aspect of the present invention, there is provided a mobile unit identification method dividing each of time series pictures to blocks each including a plurality of pixels to process the pictures, wherein the method assigns identification code of a plurality of mobile units included in a frame picture at a time t in units of the block, and obtains motion vectors of the plurality of mobile units in units of the block, in a case where identification code of the plurality of mobile units included in a frame picture at a time (t−1) have been assigned in units of the block, and motion vectors of the plurality of mobile units have been obtained in units of the block, the method comprises the steps of:

(a) moving a block j at the time (t−1), whose identification code is IDj and whose motion vector is Vj, by the vector Vj to obtain a substantially corresponding block i at the time t and moving the block i by a vector −Vj to obtain a first box at the time (t−1), to calculate an evaluation value associated with a correlation between an image in the first box at the time (t−1) and an image of the block i at the time t;

(b) moving a block k at the time (t−1), whose identification code is IDk and whose motion vector is Vk, by the vector Vk to obtain a substantially corresponding block which is the block i at the time t and moving the block i by a vector −Vk to obtain a second box at the time (t−1), to calculate an evaluation value associated with a correlation between an image in the second box at the time (t−1) and the image of the block i at the time t; and (c) assigning the identification code IDj or IDk to the block i at the time t on the basis of magnitudes of the evaluation values calculated in the steps (a) and (b).

With this configuration, since a motion vector of each block is used, it is possible to assign one of a plurality of identification codes to a block within one cluster including a plurality of mobile units having different velocities at a time t; thereby enabling to divide the one cluster into clusters with different identification codes. That is, it becomes possible to track mobile units, for which it was not possible in the prior art, leading to a contribution to more accurate detection of such as a collision accident or a traffic violation.

For example, the evaluation value of the step (a) includes a sum over p=1 to Na of a value associated with a value |VCm(t−1)−VBp(t−1)| on the assumption that an identification code of the block i at the time t is IDj, where VCm(t−1) denotes a motion vector of a block m at the time (t−1), the block m at the time (t−1) corresponds to the block i at the time t, and VBp(t−1) denotes a motion vector of a block whose identification code is IDj and which is adjacent to the block m at the time (t−1), wherein the evaluation value of the step (b) includes a sum over q=1 to Nb of a value associated with a value |VCn(t−1)−VBq(t−1)| (for example, |VCn(t−1)−VBq(t−1)|$^r$, r>1) on the assumption that an identification code of the block i at the time t is IDk, where VCn(t−1) denotes a motion vector of a block n at the time (t−1), the block n at the time (t−1) corresponds to the block i at the time t, and VBq(t−1) denotes a motion vector of a block whose identification code is IDk which is adjacent to the block n at the time (t−1).

With this configuration, even if error of a motion vector at the time (t−1) is large because almost the same pixels distribute, it becomes possible to assign block identification codes more accurately, resulting in contribution to more accurate detection of such as a collision accident or a traffic violation.

Other aspects, objects, and the advantages of the present invention will become apparent from the following detailed description taken in connection with the accompanying drawings.

BRIEF DESCRIPTION OF THE DRAWINGS

FIGS. 8(A) and 8(B) are both illustrations of classification of movements between mobile units that pass close by each other;

FIGS. 9(A) and 9(B) are both illustrations of classification of movements between mobile units that pass close by each other;

DESCRIPTION OF THE PREFERRED EMBODIMENT

Figure 1:
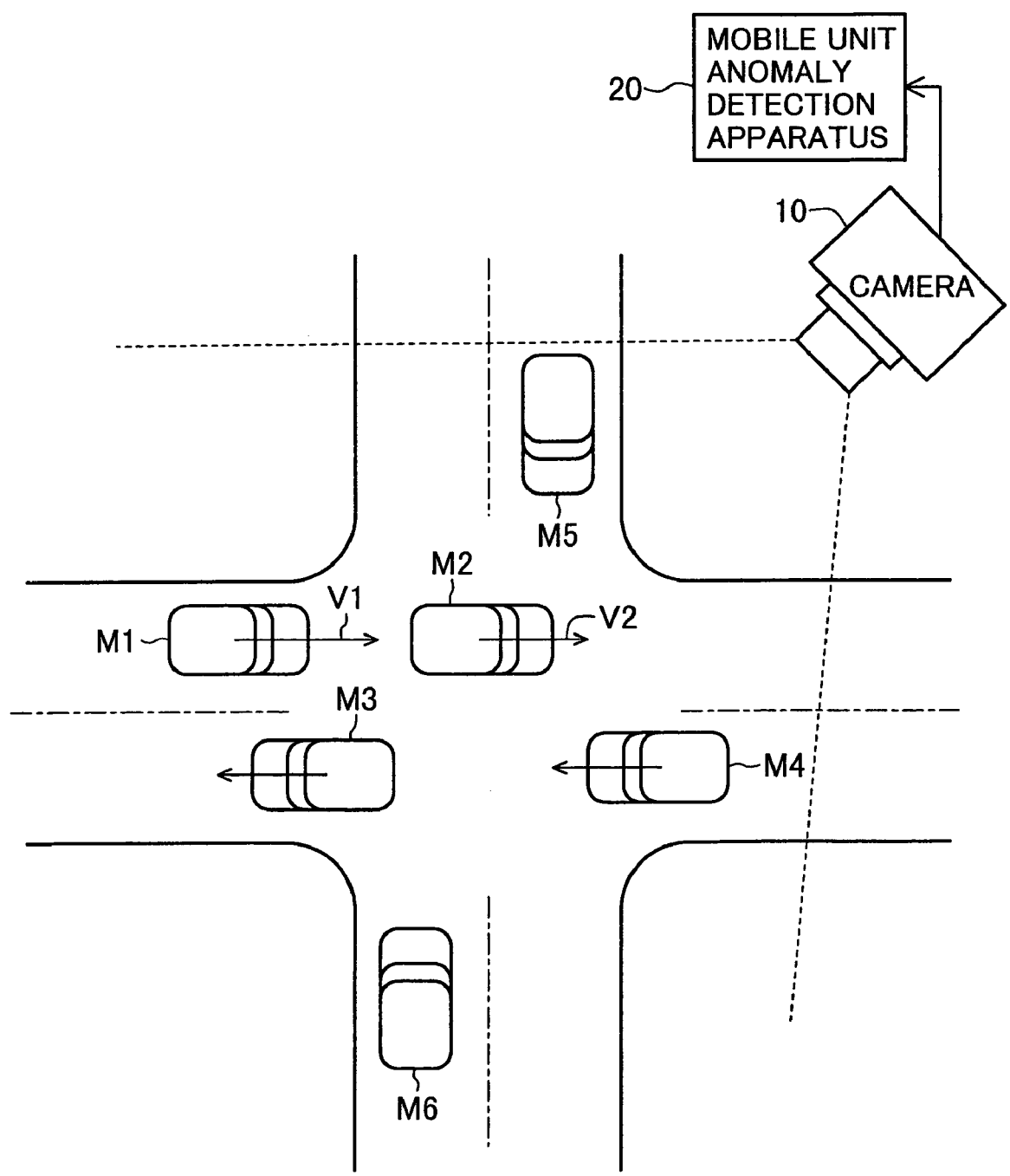
FIG. 1 is a schematic diagram showing an intersection and an apparatus, placed at the intersection, of an embodiment according to the present invention.

Referring now to the drawings, wherein like reference characters designate like or corresponding parts throughout several views, preferred embodiment of the present invention is described below.

FIG. 1 is a schematic diagram showing an intersection and a mobile unit anomaly detection apparatus, placed at the intersection, of an embodiment according to the present invention.

This apparatus is provided with an electronic camera 10 shooting the intersection to output a picture signal and a mobile unit anomaly detection apparatus 20 processing pictures to automatically detect a collision accident between mobile units and a mobile unit failure.

Figure 2:
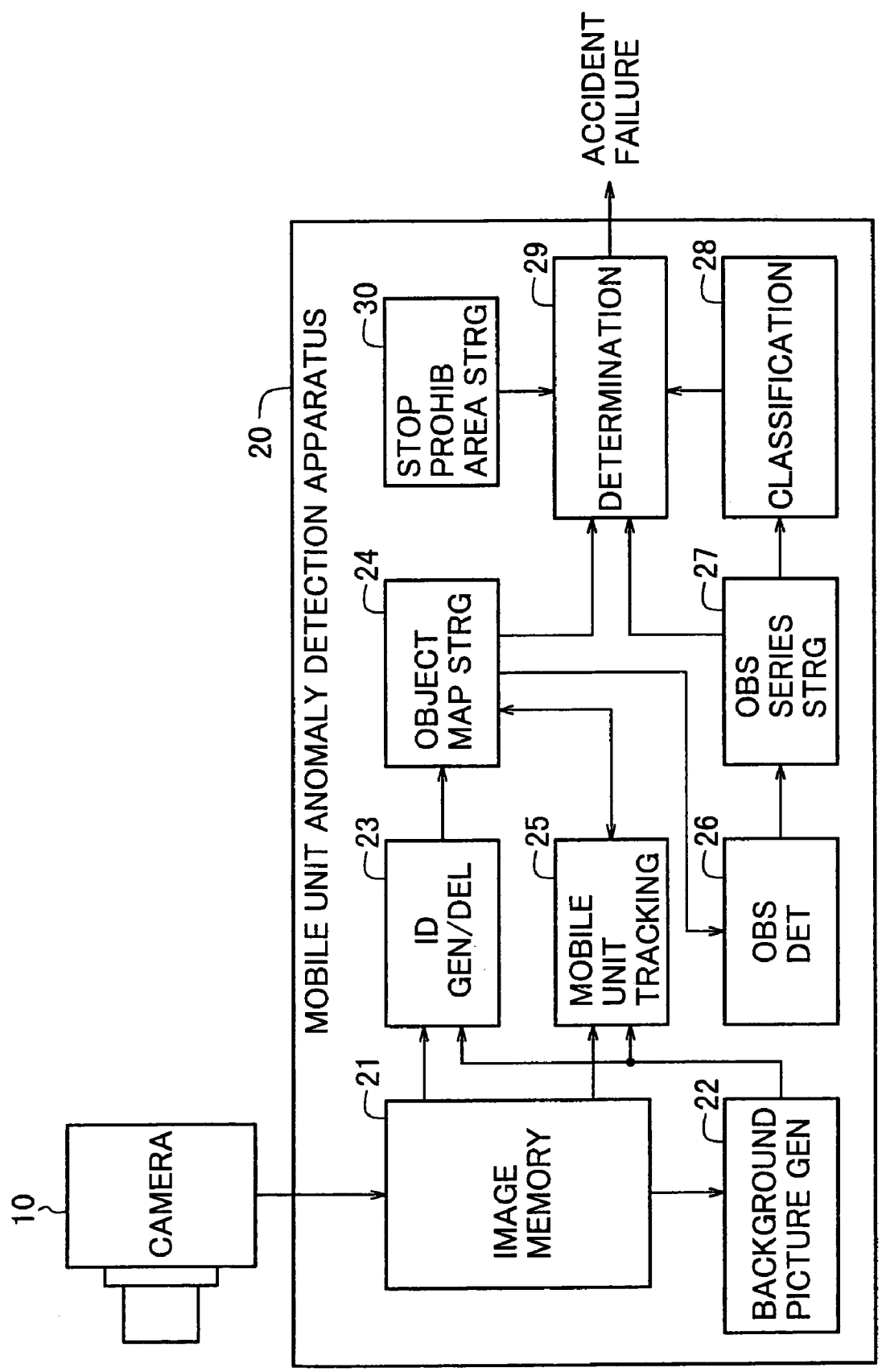
FIG. 2 is a functional block diagram of the mobile unit anomaly detection apparatus in FIG. 1.

FIG. 2 is a functional block diagram of the mobile unit anomaly detection apparatus 20 in FIG. 1. Of constituents of the mobile unit anomaly detection apparatus 20, each constituent other than storage sections can also be constructed of computer software or a dedicated hardware. Time series pictures shot by the electronic camera 10 are stored into an image memory 21 at a rate of, for example, 12 frames/sec.

A background picture generation section 22 is provided with a storage section and a processing section. This processing section accesses the image memory 21 to prepare histograms of respective pixels, each histogram having corresponding pixel values of all the frames, for example, over the past 10 minutes to generate a picture with no mobile unit therein as a background picture whose each pixel value is the mode of the corresponding histogram, and to store the background picture into the storage section. This processing is repeated periodically to update the background picture.

Figure 4:
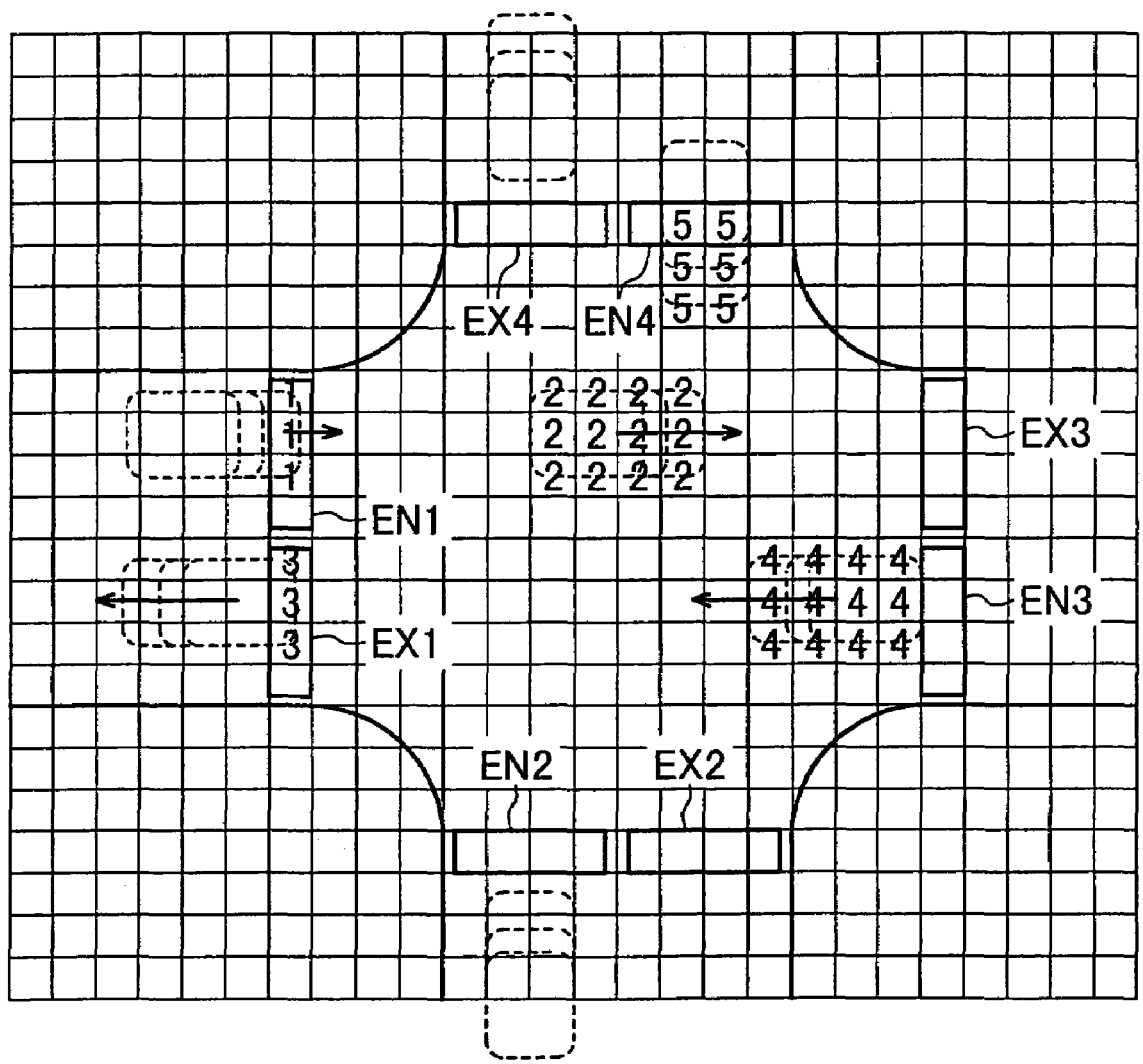
FIG. 4 is an illustration of slits set at 4 entrances to the intersection and 4 exits therefrom and identification codes of mobile units assigned to blocks.

As shown in FIG. 4, data of the positions and sizes, in a picture frame, of slits EN1 to EN4 disposed at 4 entrances to an intersection and EX1 to EX4 disposed at 4 exits therefrom are in advance set in an ID generation/deletion section 23. The ID generation/deletion section 23 reads picture data in the entrance slits EN1 to EN4 from the picture memory 21 to determine whether or not a mobile unit exists in the entrance slits in block units. Squares in a mesh of FIG. 4 are blocks, each block is of a size of, for example, 8×8 pixels and in a case where one frame is constituted of 480×640 pixels, one frame is divided into 60×80 blocks. Whether or not a mobile unit exists in a block is determined by whether or not a total sum of differences between pixels in the block and corresponding pixels of the background picture is greater than a predetermined value. The determination is also performed in a mobile unit tracking section 25.

The ID generation/deletion section 23 assigns a new cluster identification codes ID to a block when determined that a mobile unit exists in the block. when determined that a mobile unit exists in a block adjacent to another block to which ID has been assigned, ID generation/deletion section 23 assigns the same ID as that of the block having been assigned to this adjacent block. This block to which ID has been assigned may be one adjacent to an entrance slit. For example in FIG. 4, ID=1 is assigned to blocks in the entrance slit EN1 in which a mobile unit exists and ID=5 is assigned to blocks in the entrance slit EN4 □and their neighboring blocks□ in which a mobile unit exists.

Assignment of ID is performed to corresponding blocks in an object map storage section 24. The object map storage section 24 is used for storing information (object map) for facilitation of processing in regard each of the blocks 60×80 in the above case, and the information includes flags each indicating whether or not ID has been assigned. In regard to each block, when the ID has been assigned, the information further includes the ID number and a block motion vector described later. Note that without using the flag, ID=0 may be used for indicating no assignment of ID. Further, the most significant bit of ID may be the flag.

For each cluster having passed through an entrance slit, the mobile unit tracking section 25 assigns the same ID to blocks located in a moving direction and deletes the same ID of blocks located in a direction opposite to the movement, that is, performs tracking processing for clusters. The mobile unit tracking section 25, as described later, generates an object map at a time t on the basis of an object map and frame picture at a time (t−1).

The mobile unit tracking section 25 performs the tracking processing as far as and within an exist slit for each cluster.

The ID generation/deletion section 23 further checks whether or not ID is assigned to the blocks in the exit slits EX1 to EX4 on the basis of contents of the object map storage section 24 and if assigned, deletes the ID when the cluster having the ID has passed though an exit slit. For example, when transition has been performed from a state where an ID is assigned to blocks in the exit slit EX1 in FIG. 4 to a state where no ID is assigned thereto, ID=3 is deleted. The deleted ID can be used as the next ID to be generated.

An observation amount detecting section 26 obtains a mean motion vector of each cluster on the basis of contents of the object map storage section 24 as a motion vector of the cluster, obtains a relative motion vector and a relative position vector between clusters, further obtains the shortest distance between the clusters, and thereby obtains an observation amount described below. The observation amount detecting section 26 stores the observation amount into an observation series storage section 27 to generate an observation series in regard to each between clusters.

As an observation amount, consideration is given to a first scalar obtained by quantizing an amount associated with a relative motion vector and a second scalar obtained by quantizing a relative position vector. First, description will be given of the first scalar and its time series.

Figure 5A:
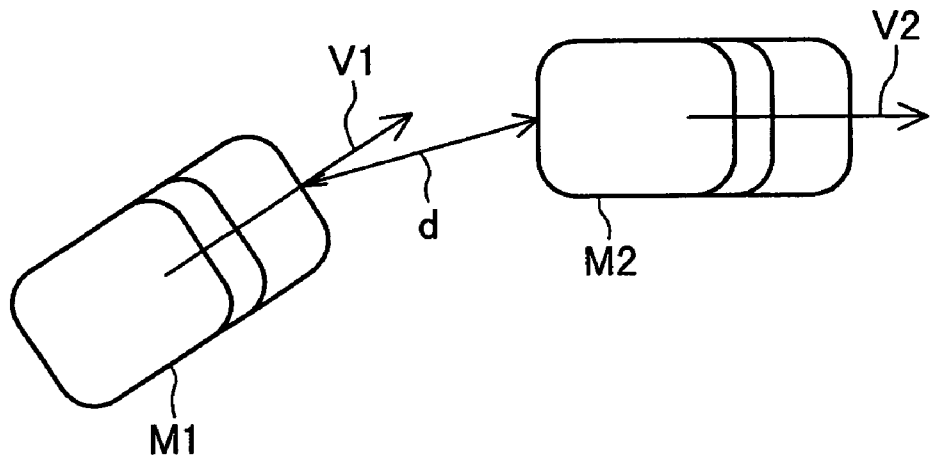
FIG. 5 is an illustration of vectors for explaining a processing at the observation amount detecting section in FIG. 2.
Figure 5B:
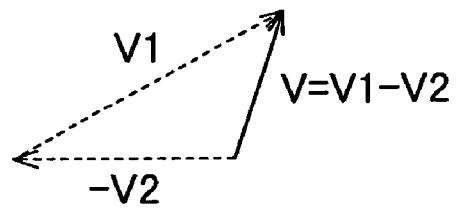
Figure 6:
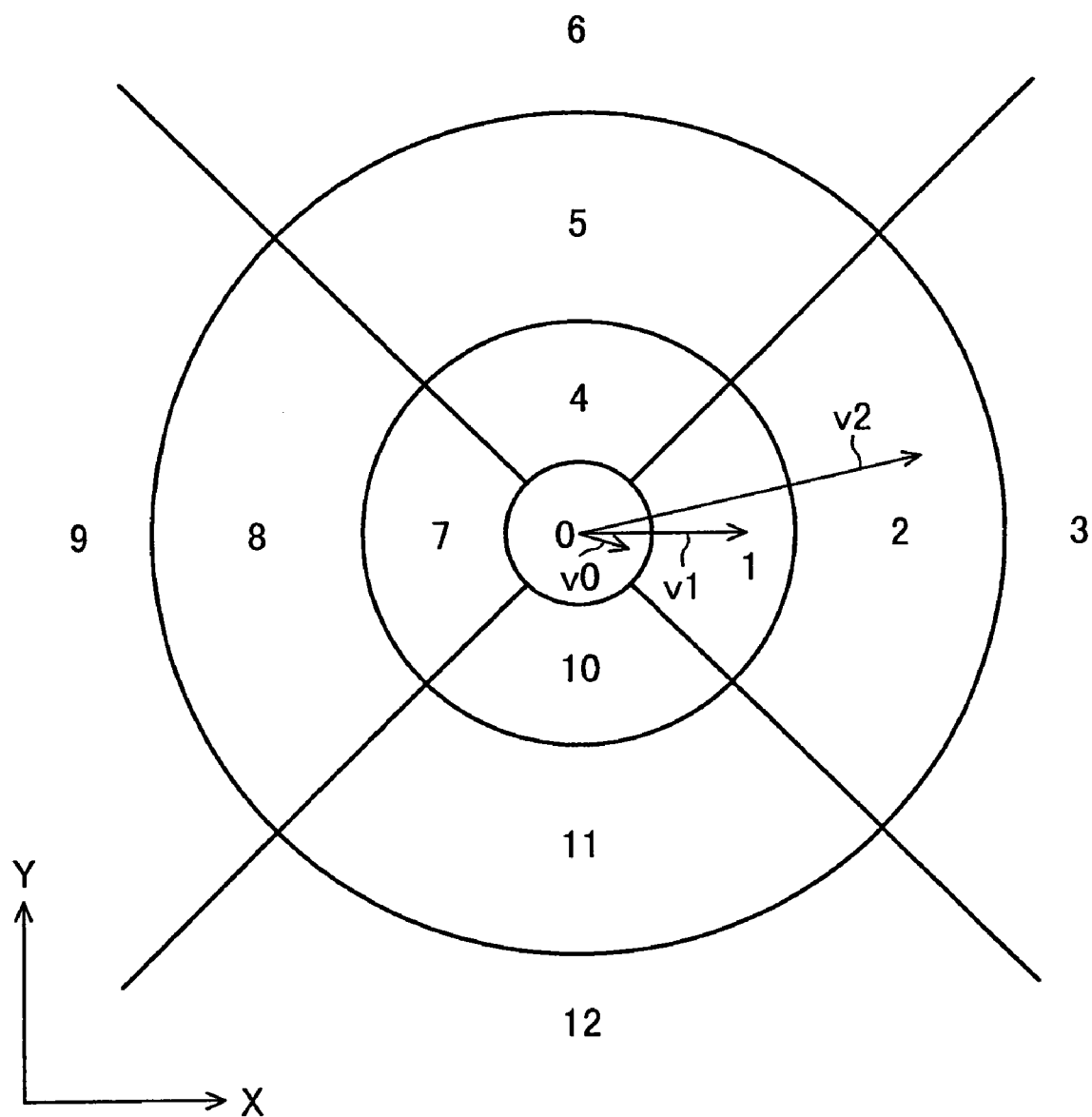
FIG. 6 is an illustration of quantization of a vector V/D.

For example, FIG. 5(B) shows a relative motion vector V of a motion vector V1 of a mobile unit M1 and a motion vector V2 of a mobile unit M2 shown in FIG. 5(A). As shown in FIG. 5(A), letting d be the shortest distance between the mobile units M1 and M2, consider a vector V/D, where D=d+ε and ε is a constant for guaranteeing D>0 when d=0. It will be easy to determine a collision from a time series of vectors V/D since V=0, namely V/D=0 in collision and |V/D| takes large values before and after the collision. In order to simply classify many of relative states between the mobile units M1 and M2, the vector V/D is quantized to a scalar as shown in FIG. 6. That is, letting an area divide into regions as shown in FIG. 6 with the origin of the vector V/D being the center of the area, and assigning scalars to respective divided regions, the vector V/D is quantized to the scalar of a region to which the tip of the vector belongs.

For example, in a case where a time series of V/D=v is v0→v1→v2, which is denoted by (v0, v1, v2) and quantized to (0, 1, 2). The time series of quantized observation amounts is referred to as an observation series. In a collision accident shown in FIG. 10, the observation series over a time t=4 to 9 is denoted by (1, 2, 3, 0, 8, 7). By such quantization, various kinds of collision accidents can be easily recognized since a collision pattern and another collision pattern analogous to it have the same observation series as each other. Further, by the quantization, an observation series is a simple sequence of numerical values, therefore a subsequent recognition process can be simplified.

Figure 5C:
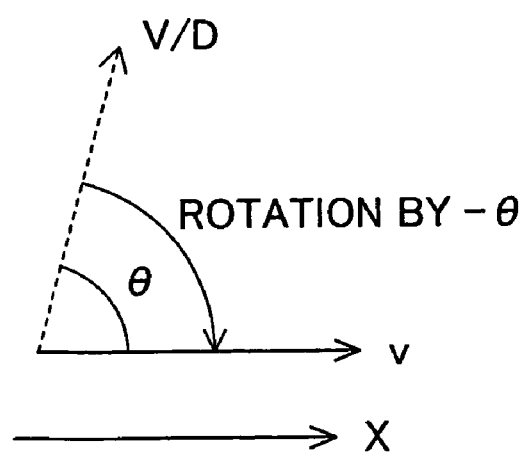

Determination of a collision accident or not is performed by whether or not a similarity between an observation series and a reference series of each of some collision accidents (for example, observation series of each collision accident actually having happened) exceeds a predetermined value. Although the number of necessary reference series can be reduced by the above quantization, in order to further reduce the number, in a case where a time series pattern of a relative movement becomes the same by rotating a stationary coordinate system, an observation series is adjusted to be the same. For this purpose, regarding the above (v0, v1, v2) for example, the reference direction of the first vector v0 in the time series, that is, an angle θ to the X axis of FIG. 6, is obtained, followed by a rotation of −θ of the vectors v0, v1 and v2. FIG. 5(C) shows the rotation in a case where V/D is the first vector in a time series. by the rotation, an observation amount of the relative vector V/D of the mobile unit M2 with respect to the mobile unit M1 and an observation amount of the relative vector −V/D of the mobile unit M1 with respect to the mobile unit M2 are equal to each other.

In a case where a mobile unit M1 and a mobile unit M2 spaced apart from each other approach and pass close by each other, thereafter they are spaced apart from each other, which is one of patterns of FIGS. 8(A), 8(B), 9(A) and 9(B) and doted lines therein show tracks of the mobile units. Observation series in the respective cases are as follows for example:

FIG. 8(A):{1, 1, 2, 2, 3, 1, 1, 1, 1, 1, 1}
FIG. 8(B):{1, 1, 1, 1, 1, 1, 1, 1, 1, 1, 1}
FIG. 9(A):{1, 1, 2, 2, 3, 1, 1, 1, 1, 1, 1}
FIG. 9(B):{1, 1, 2, 2, 3, 1, 1, 1, 1, 1, 1}

Figure 7:
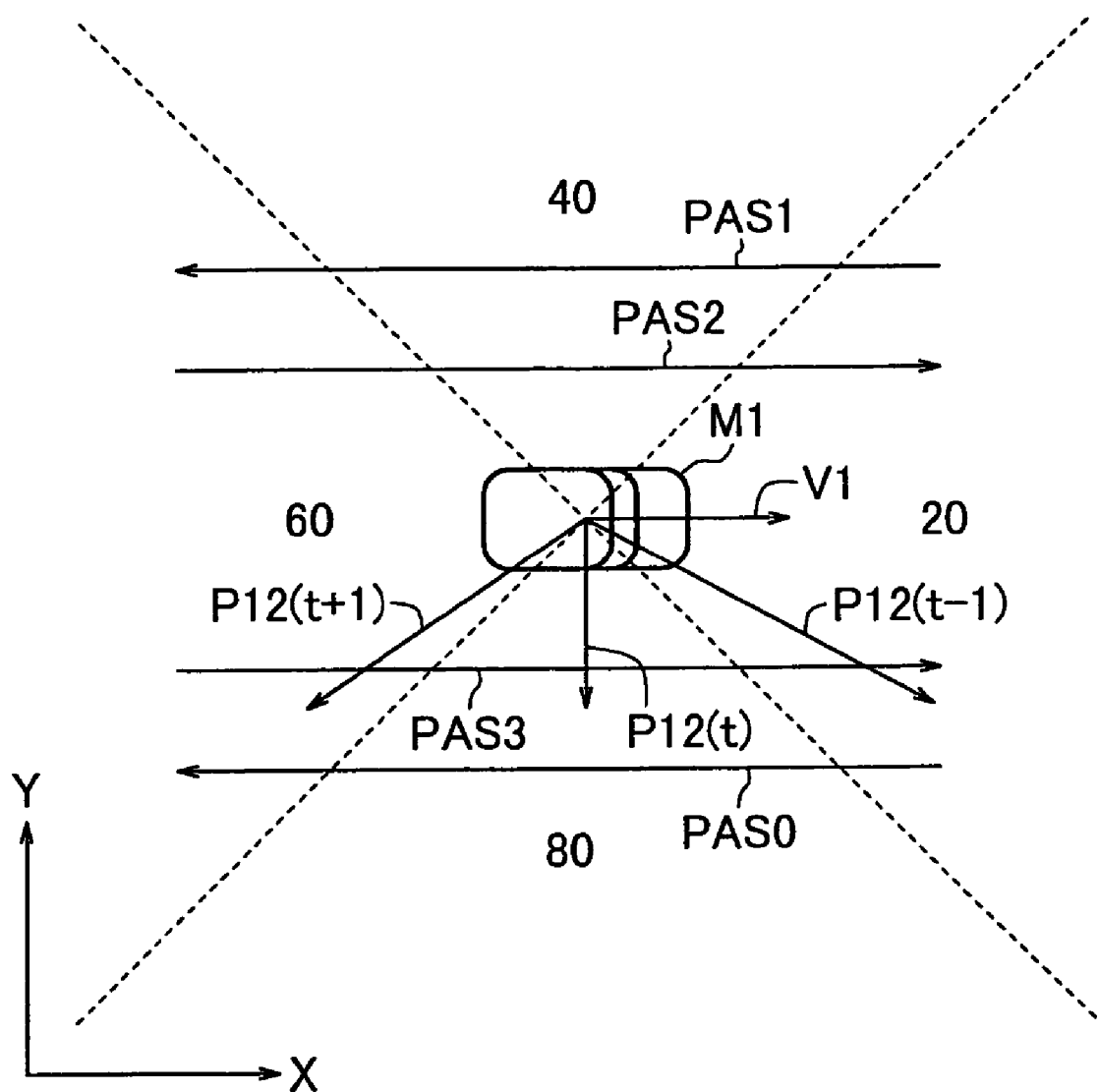
FIG. 7 is an illustration of quantization of a relative position vector and time-series classification.

As is apparent from these observation series, it is not possible to identify these relative movements from each other by the observation series of FIGS. 8(A), 8(B), 9(A) and 9(B). Therefore, in order to enable to identify the relative movements, a relative position vector of the mobile unit M2 with respect to the mobile unit M1 is quantized to obtain the second scalar as shown in FIG. 7. That is, an area is divided into regions with dotted lines as shown in FIG. 7, wherein the center of the area is the origin of the relative position vector P12 and a reference direction is equal to a direction of the motion vector V1 of the mobile unit M1, and scalars are assigned to the respective divided regions. The relative position vector P12 is quantized as a scalar of a region to which the tip thereof belongs.

In a case of FIG. 8(A) where mobile units M1 and M2 are moving in opposite directions with passing close by each other, letting a relative position vector P12 at the time t be P12($t$), a time series of relative position vectors P12(t−1), P12(t) and P12(t+1) of the mobile unit M2 with respect to the mobile unit M1 are quantized as {20, 80, 60}.

The reason why the first scalar is represented by a one-digit numerical value while the second scalar by a two-digit numerical value with the lower digit being 0 is that both can be easily synthesized. For example, in a case where the first scalar is 6 and the second scalar is 20, a value of 26, which is the sum of both, represents an observation amount. In a case where the observation amount is defined as the sum of the first scalar, and the second scalar with respect to the mobile unit M2, the observation series of FIGS. 8(A), 8(B), 9(A) and 9(B) are represented as follows:

FIG. 8(A):{21, 21, 82, 82, 83, 81, 81, 81, 81, 61, 61}
FIG. 8(B):{21, 21, 41, 41, 41, 41, 41, 41, 41, 61, 61}
FIG. 9(A):{61, 61, 42, 42, 43, 41, 41, 41, 41, 21, 21}
FIG. 9(B):{21, 21, 42, 42, 43, 41, 41, 41, 41, 61, 61}

In a case where the observation amount is defined as the sum of the first scalar, and the second scalar with respect to the mobile unit M1, the observation series of FIGS. 8(A), 8(B), 9(A) and 9(B) are represented as follows:

FIG. 8(A):{21, 21, 82, 82, 83, 81, 81, 81, 81, 61, 61}
FIG. 8(B):{21, 21, 41, 41, 41, 41, 41, 41, 41, 61, 61}
FIG. 9(A):{21, 21, 82, 82, 83, 81, 81, 81, 81, 61, 61}
FIG. 9(B):{61, 61, 82, 82, 83, 81, 81, 81, 81, 21, 21}

As shown in FIG. 7 with straight lines each having an arrow, a case where the second scalar changes as 20→80→60 is classified as PAS0, a case where the second scalar changes as 20→40→60 is classified as PAS1, a case where the second scalar changes as 60→40→20 is classified as PAS2, and a case where the second scalar changes as 60→80→20 is classified as PAS3. Further, in a case where a change in relative position vector of the mobile unit M2 with respect to the mobile unit M1 is represented as PASk and a change in relative position vector of the mobile unit M1 with respect to the mobile unit M2 is represented as PASm, it is denoted by PASkm.

In each case of FIGS. 8(A) and 8(B), a change in relative position vector of the mobile unit M2 with respect to the mobile unit M1 and a change in relative position vector of the mobile unit M1 with respect to the mobile unit M2 are the same as each other, which are classified as PAS00 and PAS11, respectively. On the other hand, in cases of FIGS. 9(A) and 9(B), a change in relative position vector of the mobile unit M2 with respect to the mobile unit M1 and a change in relative position vector of the mobile unit M1 with respect to the mobile unit M2 differ from each other, which are classified as PAS20 and PAS13, respectively.

In such a way, although it is not possible to discriminate and recognize the relative movement of mobile units only using the first scalar, this is enabled by classifying the relative movement using the second scalar, which enables more accurate understanding of the states.

For example, letting the number of clusters on an object map be 3, and IDs be 1, 2 and 3, and an observation series between clusters of ID=i and ID=j is denoted by OSi,j, observation series OS1,2; OS2,1; OS2,3; OS3,1 and OS1,3 are stored in the observation series storage section 27 of FIG. 2. The reason why OSi,j and OSj,i are both stored is to enable classification of the above PASkm with focusing attention on second scalars in a time series. In the observation series storage section 27, each of stored observation series is consisted of a predetermined number, for example, 24, of observation amounts, and every time advance by 1 the most oldest observation amount is deleted and a new observation amount is added in each observation amount.

A classification section 28 reads observation series between clusters stored in the observation series storage section 27, to calculate similarities between each of the observation series and each of predetermined reference series of collision accidents and others and to give the calculated similarities to a determination section 29 as classification results. Each of the observation series is a time series of observation amounts each having a combination of the first scalar and the second scalar, and the reference series are constituted in a similar manner. Note that calculation may be performed on a similarity to each predetermined reference series of a collision accident only with respect to the first scalar of each observation series and on a similarity to each predetermined reference series of an above PASkm with respect to the second scalar thereof to give the determination section 29 the calculated similarities as classification results.

Known pattern similarity calculation methods such as a hidden Markov model (HMM) method and a pattern matching method can be applied. For example, as disclosed in the above-described publication of JP 2001-148019-A, a probability of occurrence of the observation series may be calculated as a similarity by the HMM whose parameters have been determined using observation series of actual collision accidents as learning series.

Now, description will be given of detection of a collision accident and a mobile unit failure with reference to FIGS. 11 and 12.

Figure 10:
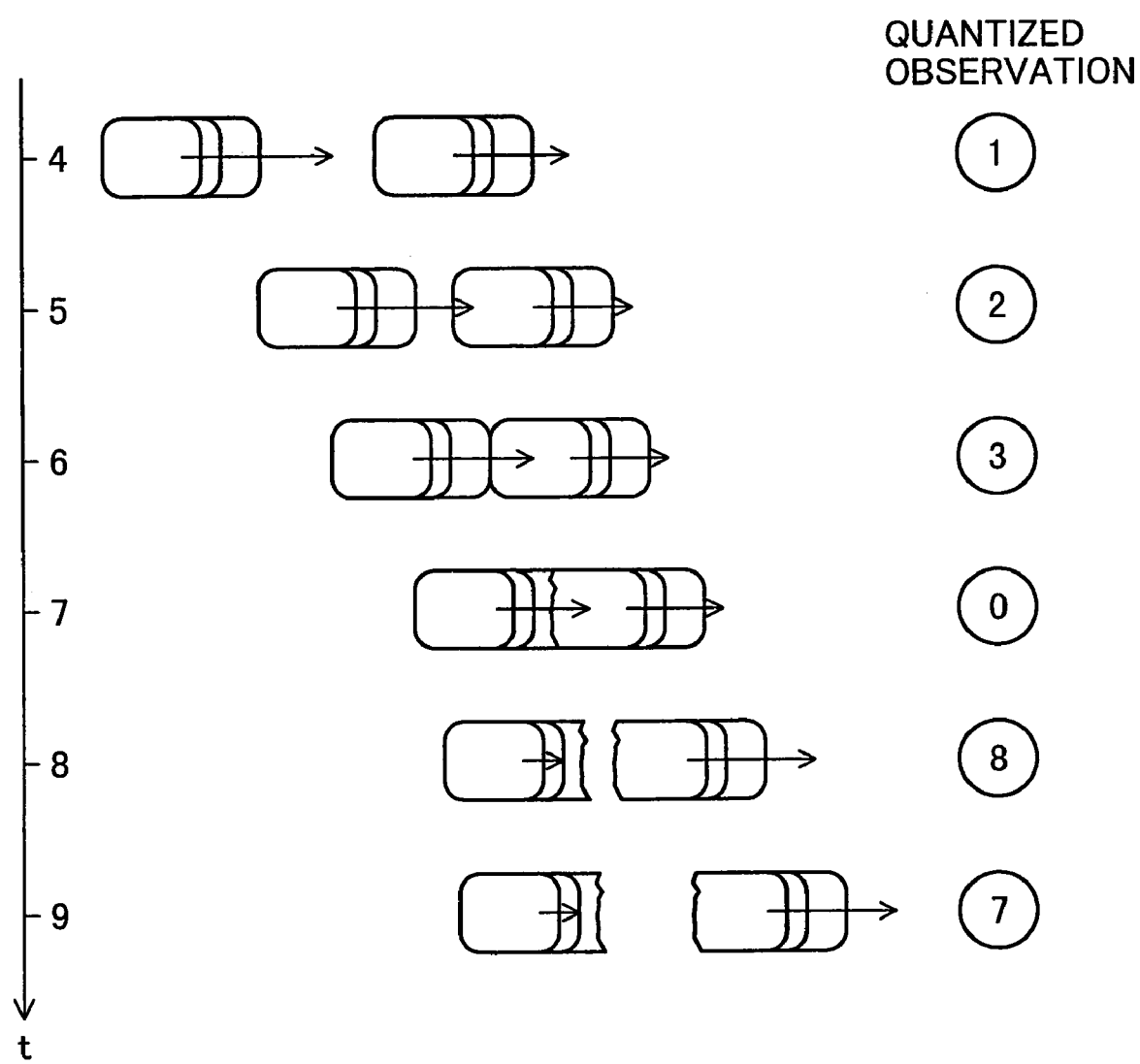
FIG. 10 is an illustration of a time-series pattern in a collision accident
Figure 11:
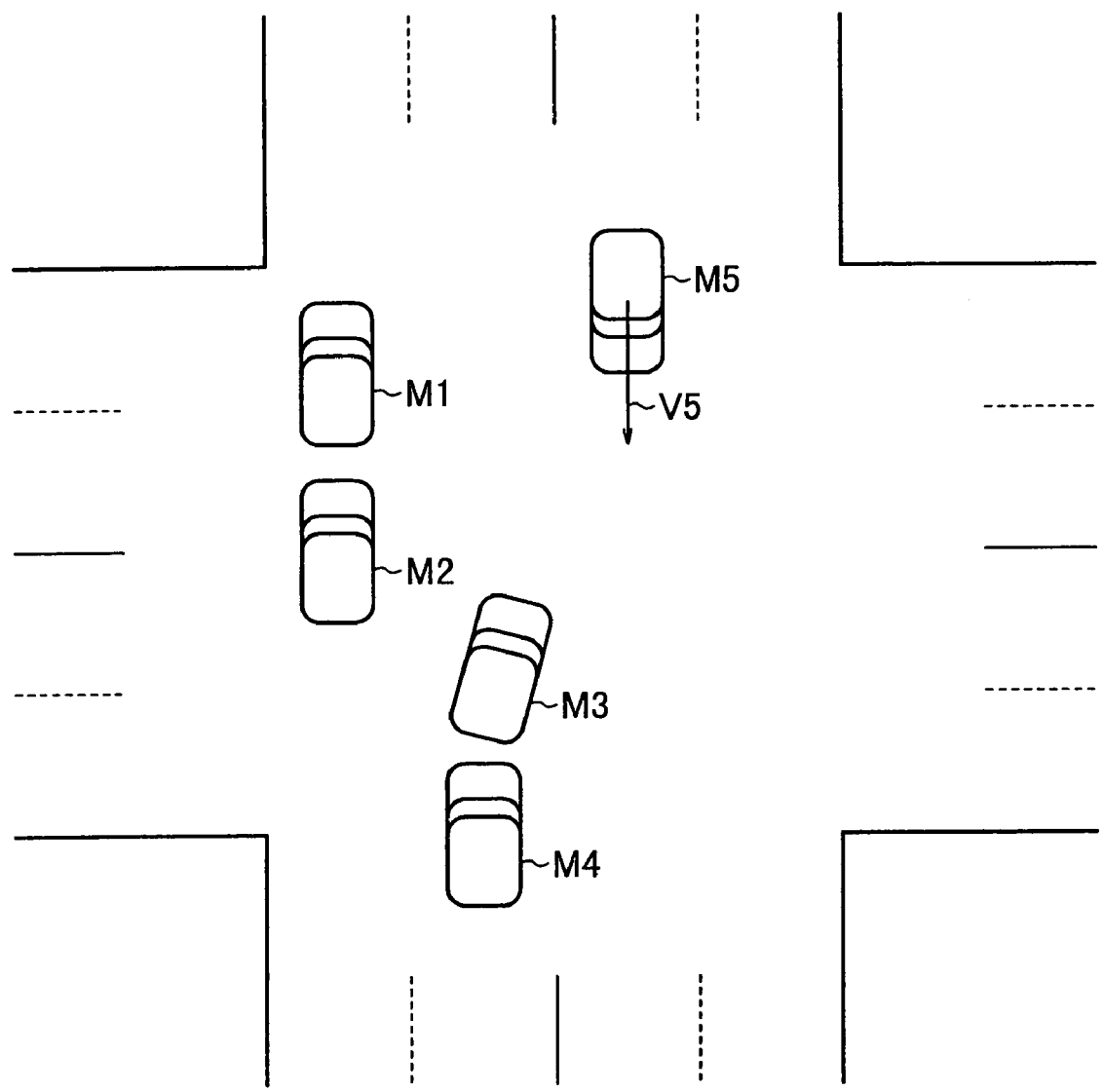
FIG. 11 is an illustration of determination of a mobile unit collision accident at an intersection.

In FIG. 11, assume that there has been occurred a collision sequence between mobile units M1 and M2 as shown in FIG. 10 or a non-collision sequence similar to this collision sequence and the mobile units M1 and M2 is stopping. This collision sequence is similar to that of a case where a mobile unit M3 is at rest to make its right turn and at that time, a mobile unit M4 approaches the mobile unit M3 from the rear, and therefore the mobile unit M3 moves a bit forward and stops. In a case where mobile units are shot at a low camera angle with respect to a road surface, the mobile units look like overlapping to each other even when the mobile units are actually spaced apart from each other, so a chance arises where the situation is classified as collision between the mobile units in pictures.

However, the mobile units M3 and M4 are in an area where stoppage is permitted for a right turn. Contrast to this, mobile units M1 and M2 exist in an area where stopping is prohibited; therefore, there is a high possibility that a collision has happened between the mobile units M1 and M2. In this case, there is a possibility that the mobile units M1 and M2 are at rest since an ambulance or the like is approaching the intersection. Therefore, if there exists another mobile unit passing close by the mobile units M1 or M2 at rest, a possibility of collision between the mobile units M1 and M2 becomes higher.

From the above consideration, a determination is performed that the case is collision between the mobile units M1 and M2: if (1) a relative movement between the mobile units M1 and M2 is classified as collision;

(2) the mobile unit M1 or M2 is at rest in a stoppage prohibition area; and (3) a mobile unit other than the mobile units M1 and M2 are moving in the intersection.

Figure 12:
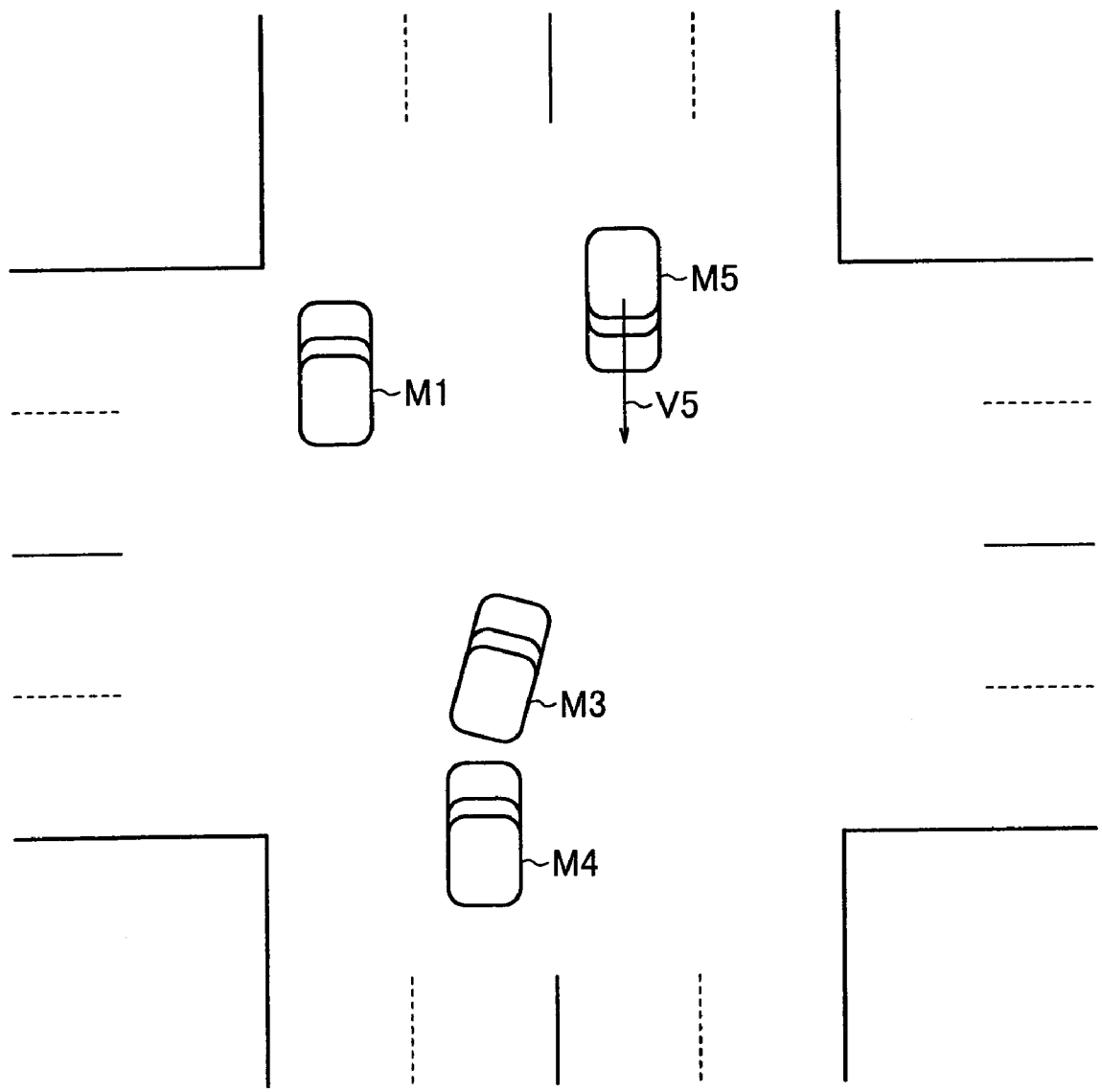
FIG. 12 is an illustration of determining a failure of a mobile unit at an intersection.

Further, as shown in FIG. 12, in a case where the mobile unit M1 has not collided with another car, but is at rest in the stoppage prohibition area, there is a high possibility that the mobile unit M1 is in failure. In this case, if another mobile unit is moving in the intersection, there is a higher possibility that the mobile unit M1 is in failure. Therefore, if the above (1) is determined negative but the above (2) and (3) are determined positive, it is determined that the mobile unit at rest is in failure.

Figure 3:
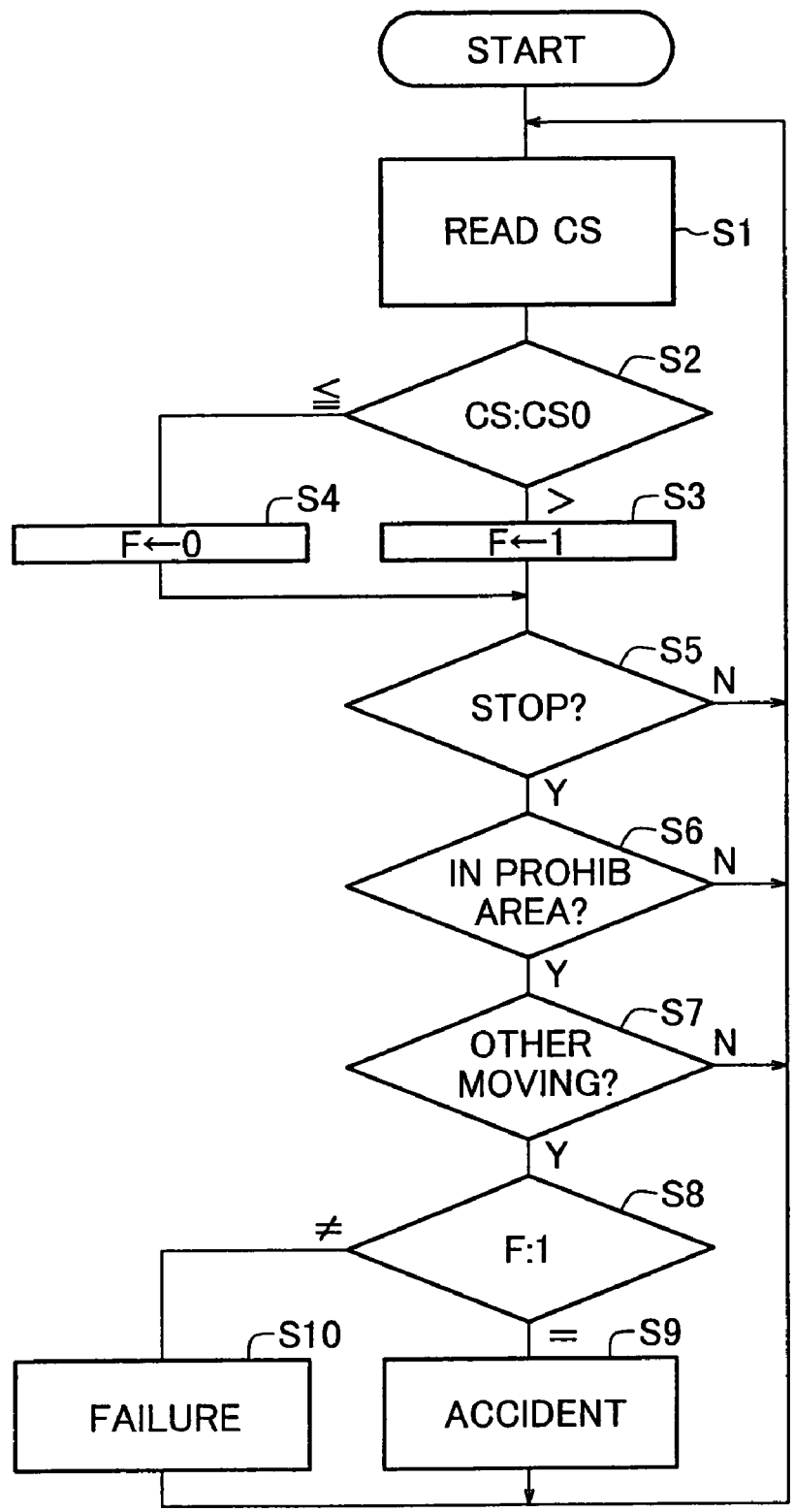
FIG. 3 is a flow diagram showing a processing of the determination section in FIG. 2.

FIG. 3 is a flow diagram showing a processing in the determination section 29 of FIG. 2.

(S1) The determination section 29 reads a maximum collision similarity CS of a pair of clusters from the classification section 28.

(S2 to S4) If the collision similarity CS is larger than a predetermined value CS0, then a flag F is set, or else the flag F is reset.

(S5) An observation series corresponding to the pair of the clusters in the step S1, is read from the observation series storage section 27, and if the first scalars of a predetermined number of observation amounts from the latest time are all zero, that is, if a state where a relative motion vector V=0 lasts for over a predetermined time period, then the object map storage section 24 is referred to investigate whether or not motion vectors of all blocks belonging to the clusters having the IDs are zero, as a result of which if all the motion vectors are zero, it is determined that the mobile unit is at rest. If not at rest, then the process returns to the step S1 to read a maximum CS of another pair of clusters, or else the process advances to the step S6.

(S6) It is investigated whether or not the cluster at rest exists within any one of the stoppage prohibition areas stored in advance in a stoppage prohibition area storage section 30, and if exists, then the process advances to step S7, or else the process returns to the step S1.

(S7) In the classification results of the classification section 28, if a similarity of a pair of clusters one of which is other than the clusters at the step S1 to a reference series of anyone of the PAS00, PAS11, PAS20 or PAS13 exceeds a predetermined value, then it is determined that there exists a mobile unit moving in the intersection and the process advances to step S8, or else the process returns to the step S1.

(S8 to S10) If F=1, then it is determined to be an accident, or if F=0, then it is determined that the mobile unit is in failure, and this result is outputted. Then the process returns to step S1.

According to such processing, a collision accident and a mobile unit failure can be automatically detected with a high probability.

Now, detailed description will be given of a method for preparing an object map at a time t on the basis of an object map and a frame picture at a time (t−1) and a frame picture at the time t in the mobile unit tracking section 25 of FIG. 2.

Figure 13:
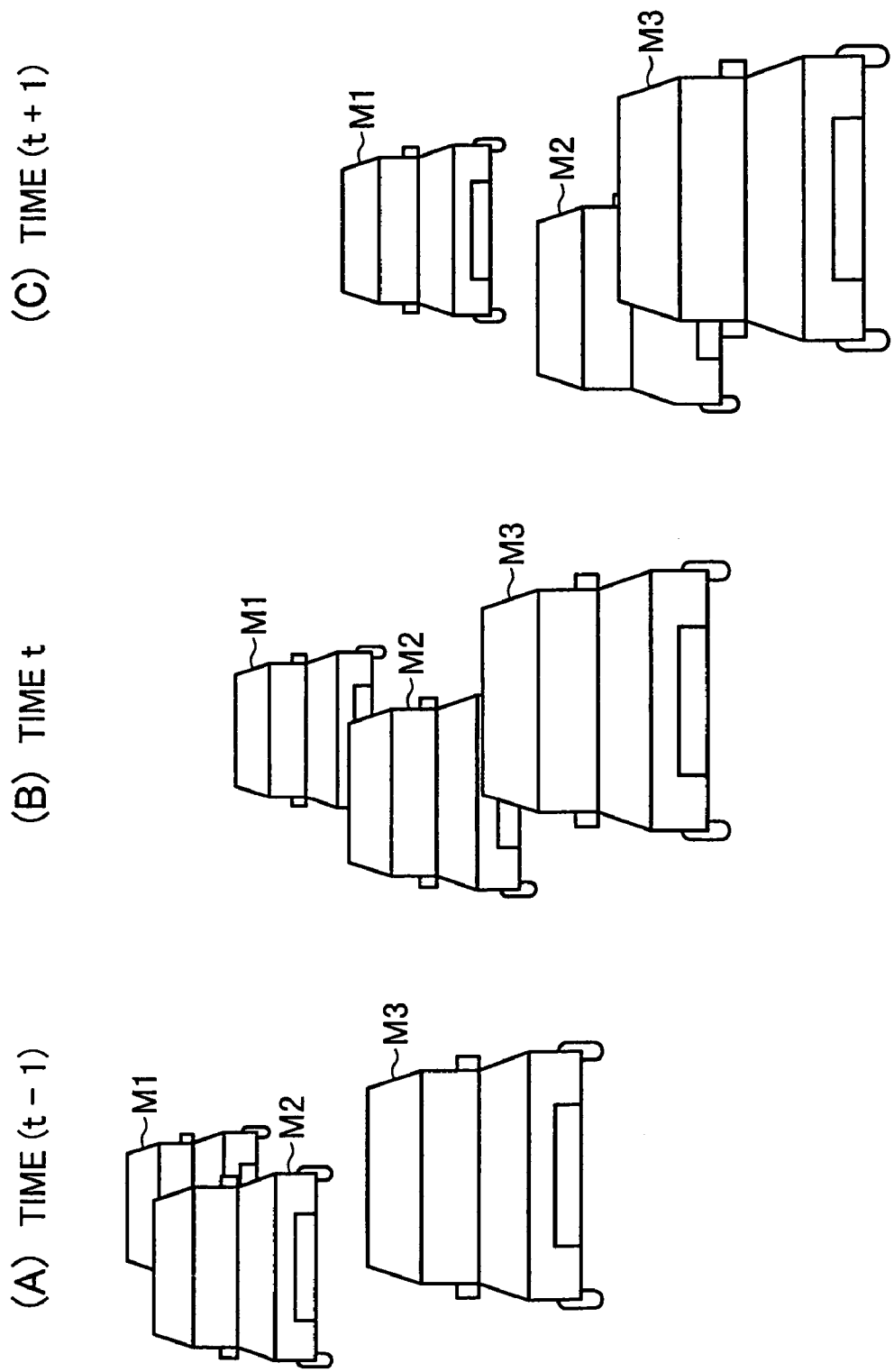
FIG. 13 is an illustration of a case where an overlap between mobile units on a picture frequently occurs.

In a case where a mobile unit is shot from the front thereof at a low camera angle with respect to a road surface in order to shoot a wide area with one camera to track mobile units, overlaps between mobile units in pictures frequently occurs as shown in (A) to (C) of FIG. 13.

Figure 14:
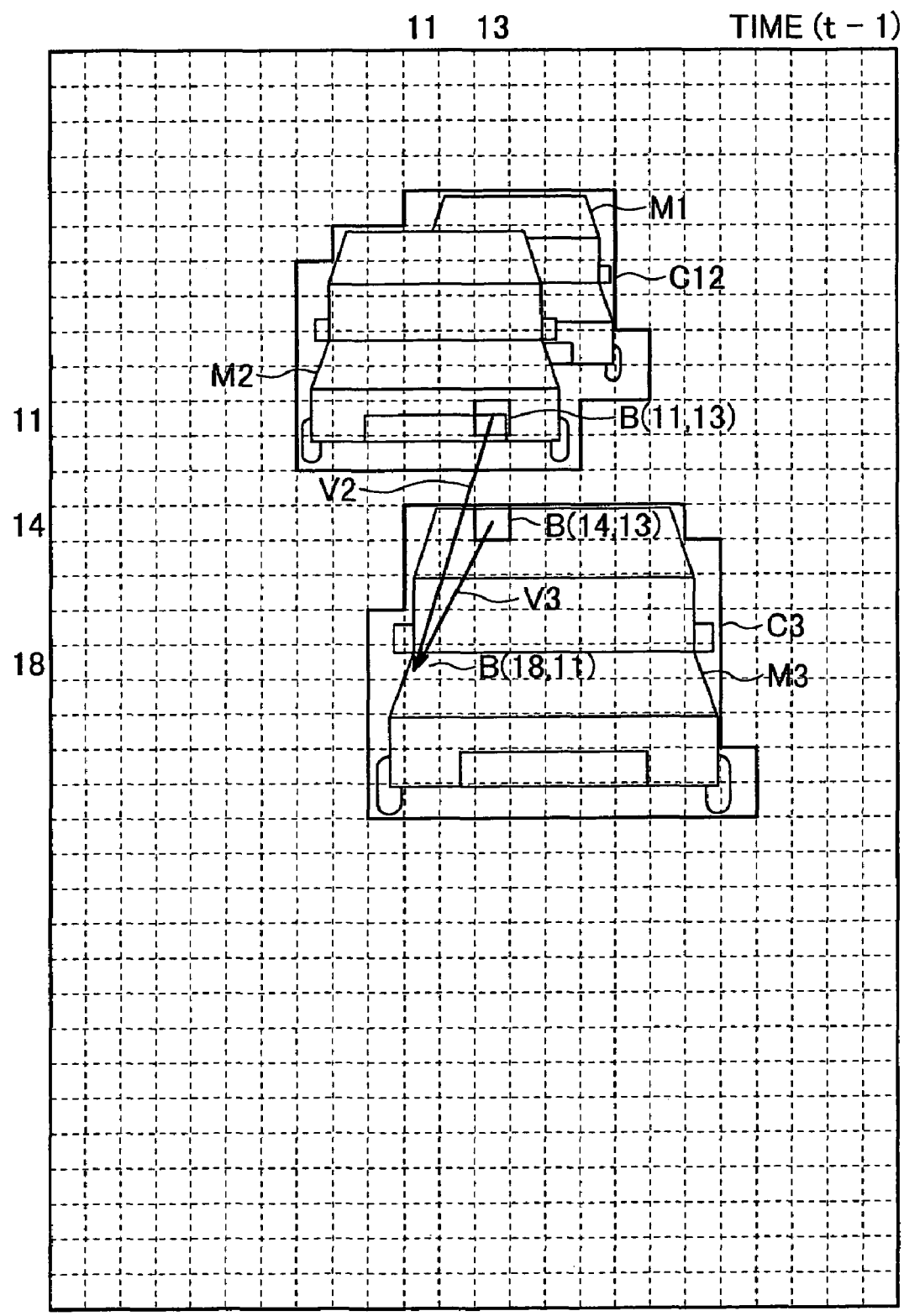
FIG. 14 is an illustration of preparing an object map.
Figure 15:
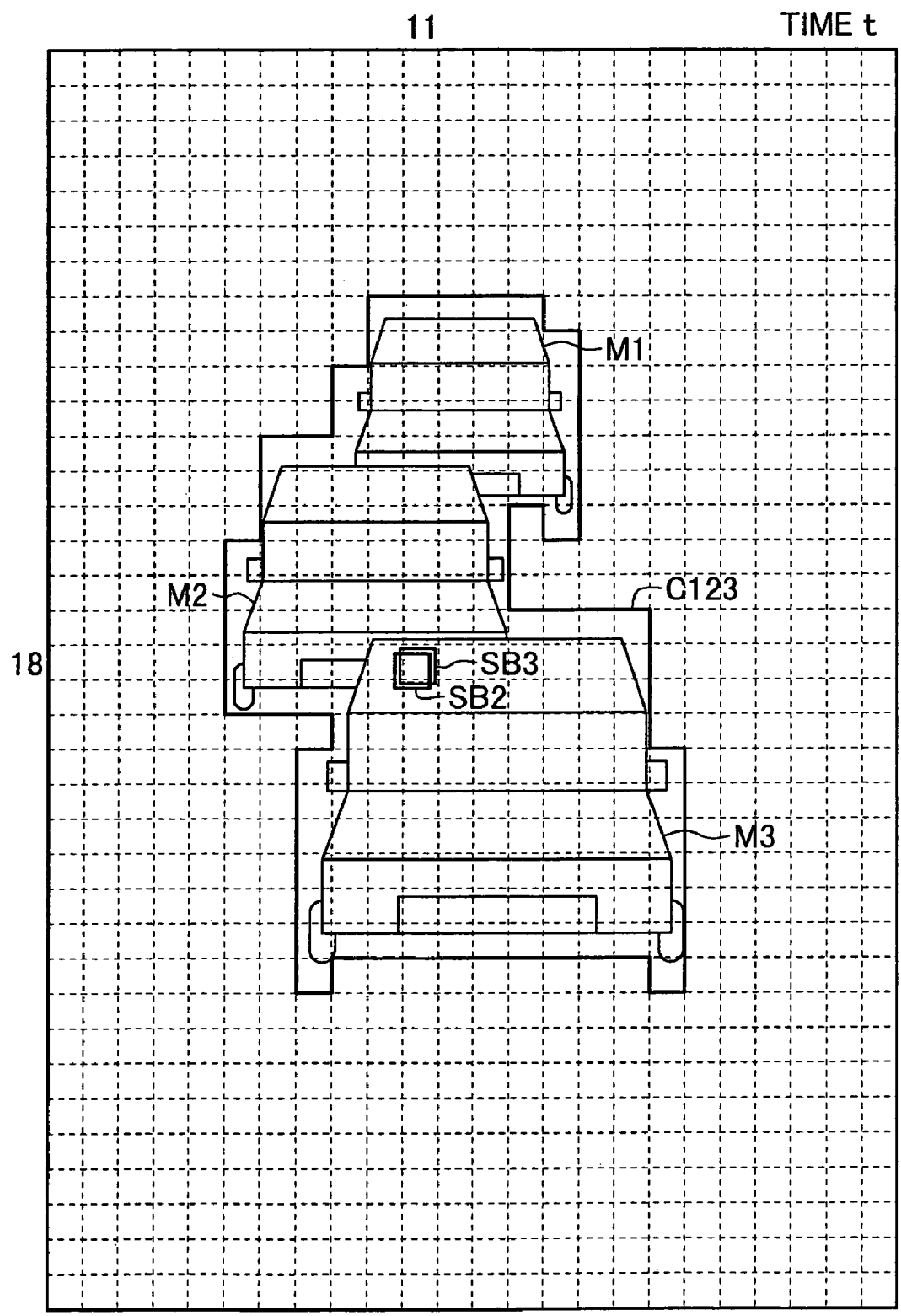
FIG. 15 is an illustration of preparing an object map.

FIGS. 14 and 15 show enlarged pictures of (A) and (B) of FIG. 13, respectively. Dotted lines are for dividing a picture into blocks. In FIG. 14, overlapped mobile units correspond to one cluster C12 in the object map storage section 24 of FIG. 2, and assume that the mobile units M1 and M2 are not yet discriminated from each other. On the other hand, a cluster 3 corresponds to one mobile unit M3.

A block on the i-th row and the j-th column at a time t is denoted by B(t:i, j). As shown in FIG. 14, motion vectors of blocks B (t−1:11, 13) and B (t−1:14, 13) are denoted by V2 and V3, respectively. The tips of the motion vectors V2 and V3 both exist in a block (t −1:18, 11). In a picture at the time t of FIG. 15, frames SB2 and SB3 correspond to respective regions where the blocks B (t−1:11, 13) and B (t−1:14, 13) in the picture of FIG. 14 are moved by the motion vectors V2 and V3, respectively.

Figure 16:
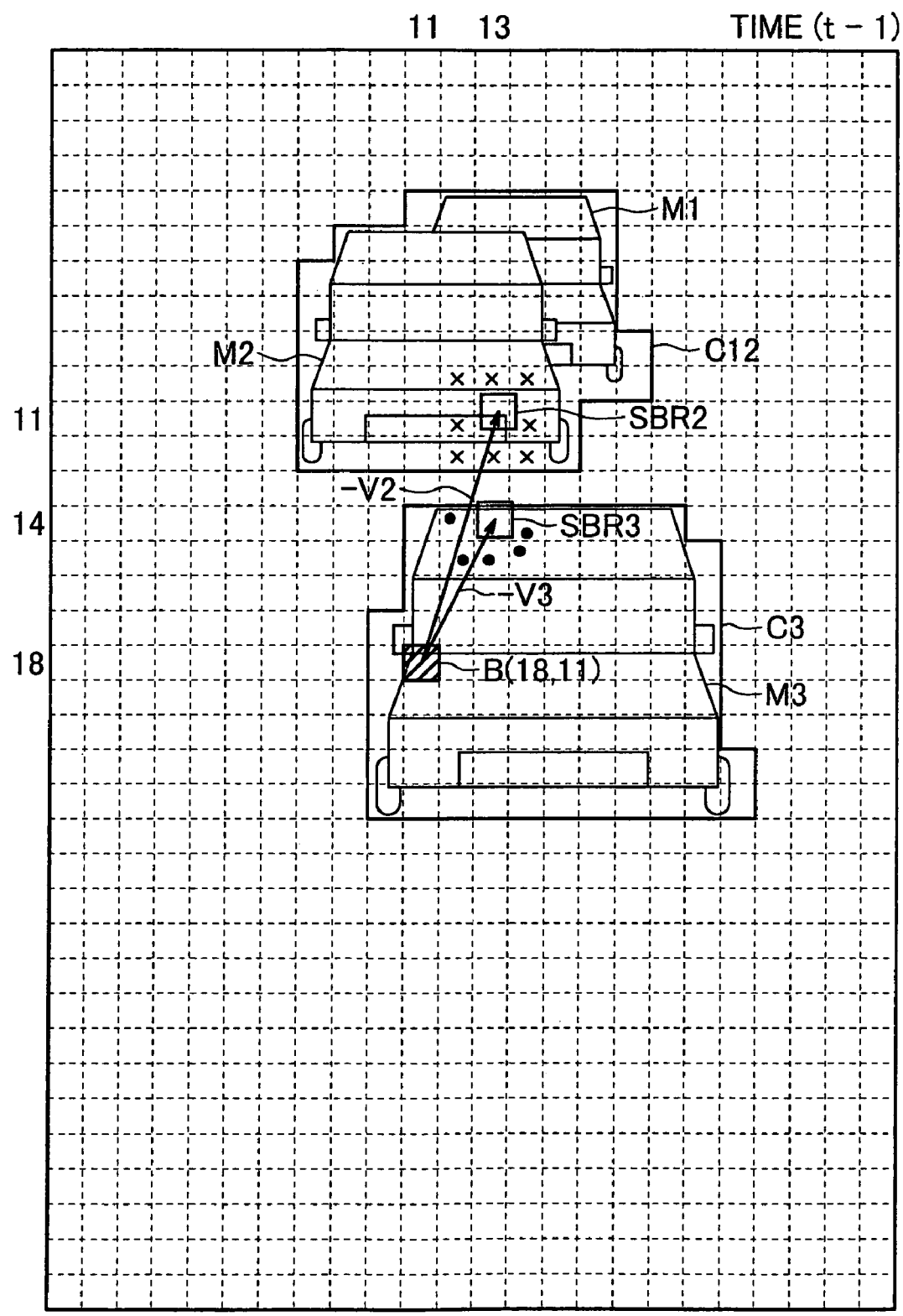
FIG. 16 is an illustration of preparing an object map.

Next, the motion vectors V2 and V3 are translated such that the tips of the motion vectors V2 and V3 both coincide with the center of the block B (18, 11). Then the motion vectors V2 and V3 are inversed and the block B (t−1:18, 11) which is hatched is moved by vectors −V2 and −V3 to obtain frames SBR2 and SBR3, respectively, as shown in FIG. 16. Images in the boxes SBR2 and SBR3 are estimated ones on the assumption that an image in the block B (t:18, 11) of FIG. 17 would have belonged to the clusters C12 and C3 of FIG. 16 at the time (t−1). IDs of the clusters C12 and C13 are denoted by ID12 and ID3, respectively.

Figure 17:
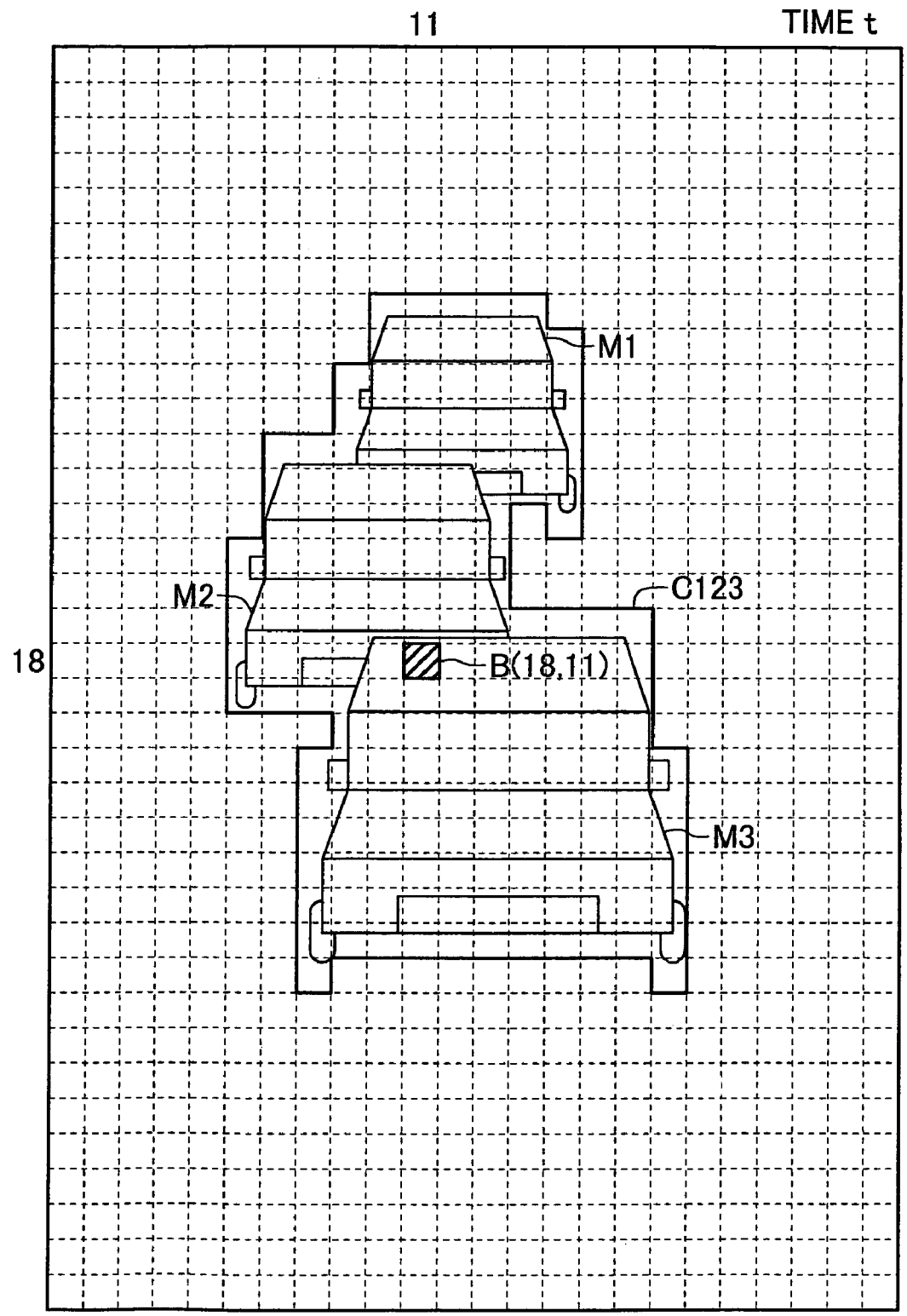
FIG. 17 is an illustration of preparing an object map.

An evaluation value UD associated with a similarity between the image in the box SBR2 of FIG. 16 and the image in the block B(t:18, 11) is calculated with the following equation, and the value is denoted by UD (ID12).

$$UD = \Sigma |SP(t-1:i, j) - BP(t:i, j)| \qquad (1)$$

where SP(t−1:i, j) and BP(t:i, j) denote pixel values on the i-th row and the j-th column in the box SBR2 of FIG. 16 and in the block B(t:18, 11) of FIG. 17, respectively, and Σ denotes a sum over i=1 to 8 and j=1 to 8 (a sum over all pixels in a block or box). The smaller the evaluation value UD is, the higher the correlation is.

Likewise, an evaluation value UD associated with a correlation between the image in the block SBR3 of FIG. 16 and the image in the block B(t:18, 11) of FIG. 17 is calculated, and the value is denoted by UD(ID3).

In the case of FIGS. 16 and 17, UD(ID3)<UD(ID12) holds and thereby ID3 is assigned to the block B(t:18, 11).

In such a way, by using a motion vector of each block, different IDs can be assigned to blocks included in the cluster C123 including a plurality of mobile units at the time t, and thereby one cluster C123 can be divided into subclusters with different IDs.

How to find out the block B(t−1:11, 13) in the cluster C12 and the block B(t−1: 14, 13) in the cluster C3 both corresponding to the block B(t:18, 11) belonging to the cluster C123 of FIG. 15 is as follows: That is, letting a vector from the center of the block B(t−1:i, j) to the center of the block B(t−1:18, 11) be V(18−j, 11−j) and a motion vector of the block B (t−11:i, j) be V(t−1:i, j), it is equivalent to find out a block B(t−1:i, j) having V(t−1:j, j) satisfying the following expression:

$$|V(18-i, 11-j) - V(t-1:i, j)| < \Delta V$$

where ΔV is a constant whose value is for example, three times the number of pixels on one side of a block. In a case where a plurality of blocks corresponding to the block B(t:18, 11) exist in the cluster C12 or in a case where a plurality of blocks corresponding to the block B(t:18, 11) exist in the cluster C3, the evaluation value is obtained for each of such blocks and ID corresponding to the least evaluation value is assigned to the block B(t:18, 11).

The above procedure is applied to other blocks belonging to the cluster C123 of FIG. 15 in a similar manner.

In the above case where ID3 is assigned to the block B(t:18, 11), a motion vector of the block can be estimated to be almost equal to the vector V3. In order to obtain the motion vector of the block B(t:18, 11) more accurately, the box SBR3 is shifted by one pixel at a time in a predetermined range whose center is coincident with that of the box SBR3, the evaluation value is obtained for every shift, and the motion vector of the block B(t:18, 11) is determined to be a vector whose origin is the center of the box SBR3 when the evaluation value assumes the minimum (the highest correlation) and whose tip is the center of the block B(t:18, 11). A motion vector of a block at a time t is determined by such a block matching each time when ID is assigned to the block.

In order to estimate a similarity more accurately, amounts described below are considered.

Part of the box SBR3 in FIG. 16 is outside the cluster 3 and as the outside area is wider, it can be considered that a probability that ID of the block B(t:18, 11) of FIG. 17 is ID3 is low. Therefore, assuming that ID of the block B(t:18, 11) is equal to ID3, the number S(t−1) of pixels in the box SBR3 and belonging to the cluster C3 is obtained, and an evaluation value U associated with a correlation between the image in the box SBR3 of FIG. 16 and the image in the block B(t:18, 11) of FIG. 17 is calculated with the following equation, and the calculated value is denoted by US(ID3):

$$US = (S(t-1) - 64)^2 \qquad (2)$$

The smaller the evaluation value UD is, the higher the correlation is. Likewise, assuming that ID of the block B(t:18, 11) is equal to ID12 and the number S of pixels in the box SBR2 and belonging to the cluster C12 is obtained to calculate the evaluation value US, and the value is denoted by US(ID12). In cases of FIGS. 16 and 17, US(ID12)=0 and US(ID3)>US(ID12) hold.

U=αUD+βUS which is a linear combination of the above equations (1) and (2) is defined as an evaluation function, and it is determined that the smaller the evaluation value U, the higher the similarity is, where α and β are positive constants and determined on the basis of practical experiences such that the evaluation of similarity becomes more correct.

For each block of FIG. 17 at the time t, it is determined whether ID12 or ID3 is assigned to in a similar way as described above. Since a probability of a wrong determination is high in a case where the absolute value of a difference of evaluation values |U(ID12)−U(ID3)| is equal to or less than a predetermined value, no ID is assigned and the following amount is considered with respect to an image at a time t. For example, in a case where it is assumed that ID of the block B(t:18, 11) of FIG. 17, which has not been determined, is equal to ID3, the number N(t) of blocks assigned with ID3 among 8 blocks adjacent to the block B(t:18, 11) is obtained, an evaluation value UN is calculated with the following equation, and the value is denoted by UN(ID3):

$$UN = (N(t) - 8)^2. \qquad (3)$$

The smaller the evaluation value, the higher the correlation is. Similarly, in a case where it is assumed that ID of the block B(t:18, 11) of FIG. 17 is equal to ID12, the number N of blocks assigned with ID12 among 8 blocks adjacent to the block B(t:18, 11) is obtained, the evaluation value UN is calculated, and the value is denoted by UN(ID12).

Further, when the error of a motion vector at a time (t−1) obtained by block matching is large since almost the same pixel values are distributed, a case can be considered where the absolute value |U(ID12)−U(ID3)| of a difference in evaluation values of the linear combination U=αUD+βUS of the above equations (1) to (3) is equal to or less than a predetermined value. Therefore, by paying attention to motion vectors of blocks in the neighborhood of blocks B(t−1:14, 13) and B(t−1:11, 13) corresponding to the block (t: 18, 11), an evaluation of a similarity is made more correct. That is, an evaluation value UV is calculated using the following equation which includes a motion vector VC(t−1)=V3 of the block B(t−1:14, 13) at the time (t−1) corresponding to the B(t:18, 11) on the assumption that the block B(t:18, 11) has ID3; and motion vectors VBi(t−1), for i=1 to NX and NX=NX3, of blocks (blocks each attached with a small black dot in FIG. 16) which are ones among 8 blocks adjacent to the block B(t−1:14, 13) and whose ID is equal to ID3, and the evaluation value is denoted by UV(ID3):

$$UV = \Sigma |VC(t-1) - VBi(t-1)|^2 / NX \qquad (4)$$

where Σ denotes a sum over i=1 to NX. The smaller the evaluation value is, the higher the correlation is. Similarly, an evaluation value UV is calculated in regard to a motion vector VC=V2 of the block B(t−1:11, 13) at the time (t−1) corresponding to the B(t:18, 11) on the assumption that the block B(t:18, 11) has ID12; and motion vectors VBj(t−1), for j=1 to NX and NX=NX12, of blocks (blocks each attached with a mark x in FIG. 16) which are ones among 8 blocks adjacent to the block B(t−1:11, 13) and whose ID is equal to ID12, and the evaluation value is denoted by UV(ID12).

A linear combination of the above equations (1) to (4), $$U = \alpha UD + \beta US + \gamma UN + \Delta UV \qquad (5)$$

is used as an evaluation function and it is determined that the smaller the evaluation value, the higher the similarity is, where γ and δ are also positive constants and determined on the basis of practical experiences such that the evaluation of similarity becomes more correct.

Figure 18:
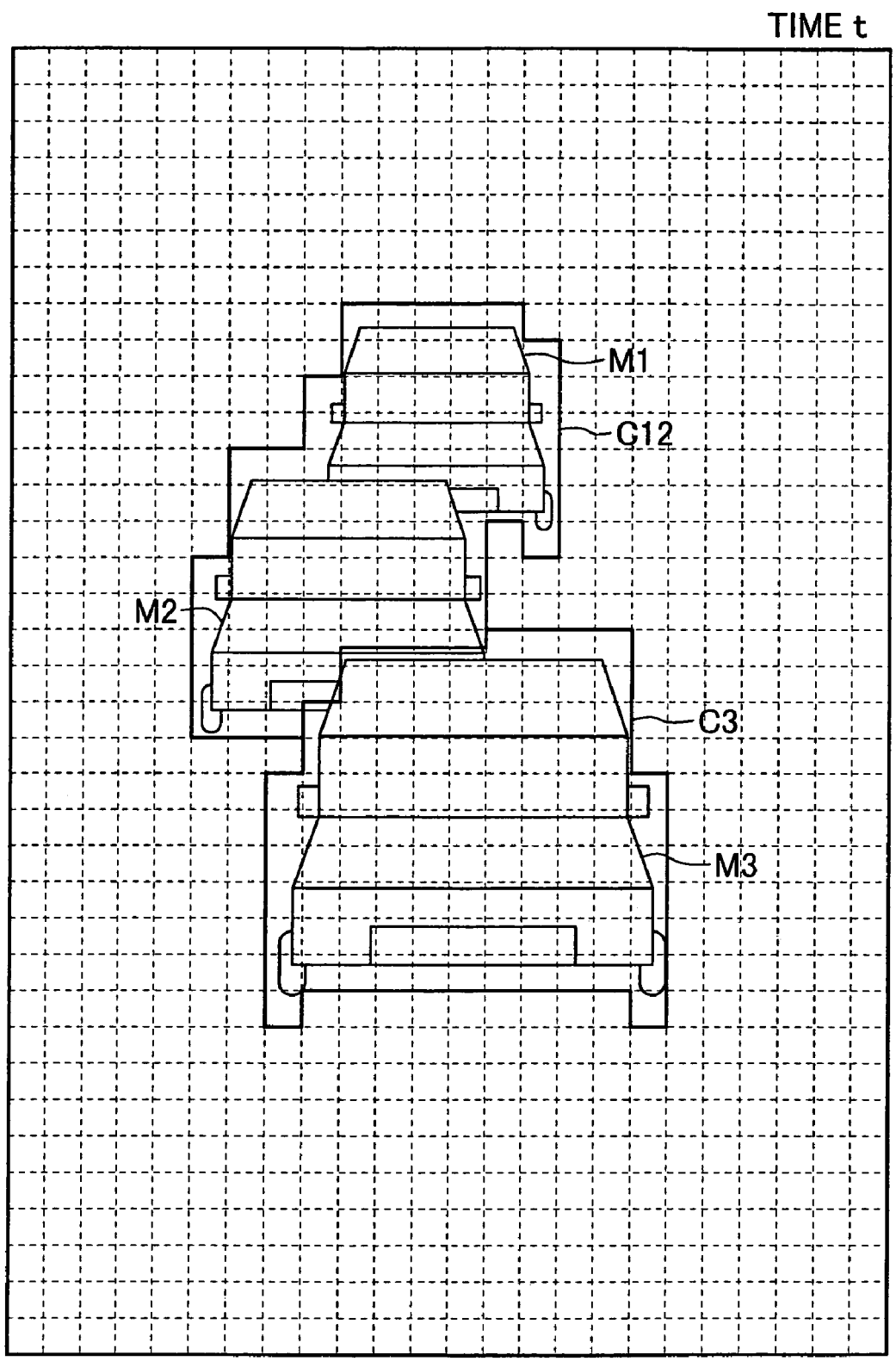
FIG. 18 is an illustration of preparing an object map.

In such a way, not only is it determined whether ID is ID12 or ID3 in each block in the cluster C123 of FIG. 17, but a motion vector of each block is also determined. That is, an object map at a time t is determined, and as shown in FIG. 18, even if the mobile unit M2 overlaps both of the mobile units M1 and M3, the cluster can be divided into clusters with different IDs.

Figure 19:
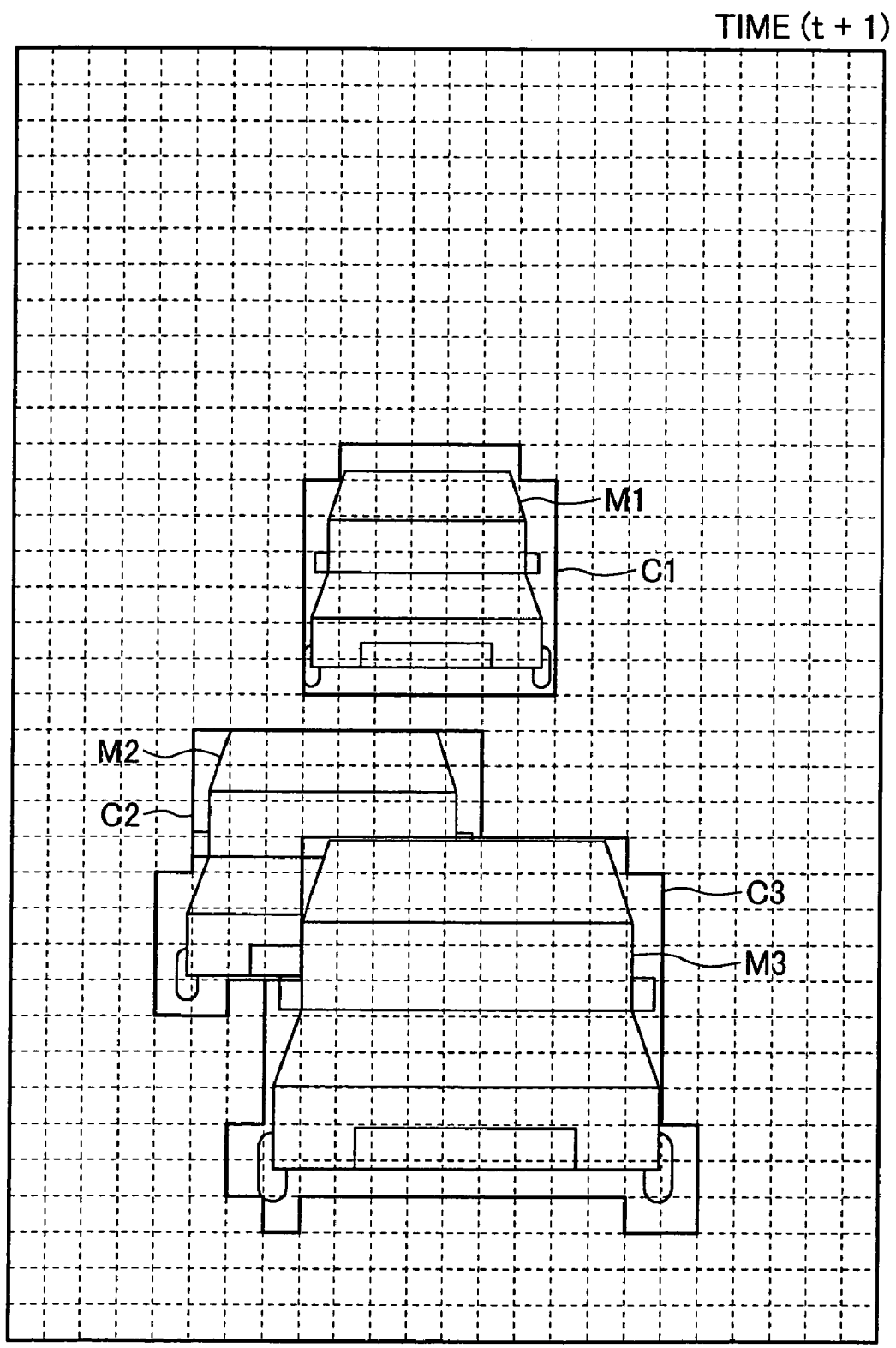
FIG. 19 is an illustration of preparing an object map.

Similarly, an object map at the time (t+1) can be obtained from a frame picture and an object map at the time t. Since C12 and C3 are discriminated from each other at the time t and the mobile unit M1 is separated from the mobile unit M2 in the frame picture at the time (t+1), as shown in FIG. 19, C1 to C3 corresponding to the mobile units M1 to M3, are discriminated from each other at the time (t+1).

Note that in a case where the equation (5) is used, one or more of β, γ and δ may be zero in order to reduce a calculation time.

Further, an object map X at a time (t−1) may be copied into a work area as an object map Y prior to preparation of an object map at a time t and a motion vector Vi of each block i whose ID is equal to IDα in the object map X may be replaced with a mean vector (ΣΔVj)/p, for j=1 to p, where ΔV1 to ΔVp are motion vectors of all blocks, in the object map Y, including a block corresponding to the block i and blocks adjacent to this corresponding block and having ID=IDα. With such a procedure, in a case where errors of motion vectors are large since a texture in a block is similar to those in adjacent blocks, the errors are reduced. Copying to a work area is for uniquely determining the mean vector.

Then, description will be given of a method for obtaining an object map more accurately using the evaluation function of the above equation (5) and an object map at a time t obtained as described above as an initial condition. Since this method itself is the same as disclosed in the above publication except for the evaluation function U, an outline thereof will be given.

The blocks in the clusters C12 and C3 of FIG. 18 are denoted by BKi, for i=1 to n. ID of a block BKi is a variable IDi and the U thereof is expressed as U(BKi, IDi). IDi is equal to ID12 or ID3. ID1 to IDn are determined such that a sum UT of evaluation values U over i=1 to n, $$UT = \Sigma U(BKi, IDi),$$

takes the minimum. Initial values of ID1 to IDn are given by an object map at the time t obtained as described above.

Although preferred embodiment of the present invention has been described, it is to be understood that the invention is not limited thereto and that various changes and modifications may be made without departing from the spirit and scope of the invention.

For example, the apparatus of FIG. 2 automatically detecting a collision accident and a vehicle failure has characteristics in the determination section 29 and observation amounts detected by the observation amount detecting section 26 may be only of the first scalars. Further, a configuration in which an observed value including the first and second scalars are used can be applied for use in an apparatus performing other than determination of a collision accident and a vehicle failure, for example, in an apparatus automatically classifying movements of mobile units to get a statistics. Furthermore, a processing method in the mobile unit tracking section 25 using the above-described evaluation function U can be applied to various kinds of mobile unit tracking apparatuses.

What is claimed is:

1. A mobile unit identification method dividing each of time series pictures to blocks each including a plurality of pixels to process said pictures, wherein said method assigns identification codes of a plurality of mobile units included in a frame picture at a time t in units of the block, and obtains motion vectors of said plurality of mobile units in units of the block, in a case where identification codes of said plurality of mobile units included in a frame picture at a time (t−1) have been assigned in units of the block, and motion vectors of said plurality of mobile units have been obtained in units of the block, said method comprises:

(a) moving a block j at the time (t−1), whose identification code is IDj and whose motion vector is Vj, by the vector Vj to obtain a substantially corresponding block i at the time t and moving said block i by a vector −Vj to obtain a first box at the time (t−1), to calculate an evaluation value associated with a correlation between an image in said first box at the time (t−1) and an image of said block i at the time t;

(b) moving a block k at the time (t−1), whose identification code is IDk and whose motion vector is Vk, by the vector Vk to obtain a substantially corresponding block which is said block i at the time t and moving said block i by a vector −Vk to obtain a second box at the time (t−1), to calculate an evaluation value associated with a correlation between an image in said second box at the time (t−1) and said image of said block i at the time t; and (c) assigning said IDj or said IDk to said block i at the time t on the basis of magnitudes of said evaluation values calculated in the steps (a) and (b).

2. The mobile unit identification method according to claim 1, wherein said evaluation value of said step (a) includes a sum over p=1 to Na of a value associated with a value |VCm(t−1)−VBp(t−1)| on the assumption that an identification code of said block i at the time t is IDj, where VCm(t−1) denotes a motion vector of a block m at the time (t−1), said block m at the time (t−1) corresponds to said block i at the time t, and VBp(t−1) denotes a motion vector of a block whose identification code is IDj and which is adjacent to said block m at the time (t−1), wherein said evaluation value of said step (b) includes a sum over q=1 to Nb of a value associated with a value |VCn(t−1)−VBq(t−1)| on the assumption that an identification code of said block i at the time t is IDk, where VCn(t−1) denotes a motion vector of a block n at the time (t−1), said block n at the time (t−1) corresponds to said block i at the time t, and VBq(t−1) denotes a motion vector of a block whose identification code is IDk and which is adjacent to said block n at the time (t−1).

3. The mobile unit identification method according to claim 1, further comprising the step of: prior to processing on said frame picture at the time t, in said frame picture at the time (t−1), replacing a motion vector of each block having an assigned identification code IDx with a mean motion vector obtained by averaging motion vectors of this block and blocks adjacent to this block and having said identification code IDx.

4. A mobile unit identification apparatus comprising:

a picture storage device storing time series pictures; and a picture processing device, dividing each of said time series pictures stored to blocks each including a plurality of pixels to process said pictures, assigning identification code of a plurality of mobile units included in a frame picture at a time t in units of the block, and obtaining motion vectors of said plurality of mobile units in units of the block, in a case where identification code of said plurality of mobile units included in a frame picture at a time (t−1) have been assigned in units of the block, and motion vectors of said plurality of mobile units have been obtained in units of the block, wherein said picture processing device performs processing of:

(a) moving a block j at the time (t−1), whose identification code is IDj and whose motion vector is Vj, by the vector Vj to obtain a substantially corresponding block i at the time t and moving said block i by a vector −Vj to obtain a first box at the time (t−1), to calculate an evaluation value associated with a correlation between an image in said first box at the time (t−1) and an image of said block i at the time t;

(b) moving a block k at the time (t−1), whose identification code is IDk and whose motion vector is Vk, by the vector Vk to obtain a substantially corresponding block which is said block i at the time t and moving said block i by a vector −Vk to obtain a second box at the time (t−1), to calculate an evaluation value associated with a correlation between an image in said second box at the time (t−1) and said image of said block i at the time t; and (c) assigning said IDj or said IDk to said block i at the time t on the basis of magnitudes of said evaluation values calculated in the processing (a) and (b).

5. The mobile unit identification apparatus of claim 4, wherein said evaluation value of said processing (a) includes a value associated with an absolute value of a difference between a motion vector of said block i at the time t on the assumption that an identification code of said block i at the time t is IDj, wherein said evaluation value of said processing (b) includes a value associated with an absolute value of a difference between a motion vector of said block i at the time t on the assumption that an identification code of said block i at the time t is IDk and a motion vector of a block adjacent to said block i.

* * * * *